(12) United States Patent
Tong et al.

(10) Patent No.: US 12,449,678 B2
(45) Date of Patent: Oct. 21, 2025

(54) WEARABLE DEVICES

(71) Applicant: SHENZHEN SHOKZ CO., LTD., Guangdong (CN)

(72) Inventors: Peigeng Tong, Shenzhen (CN); Zhen Wang, Shenzhen (CN); Lei Zhang, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 454 days.

(21) Appl. No.: 18/067,660

(22) Filed: Dec. 16, 2022

(65) Prior Publication Data

US 2023/0229025 A1 Jul. 20, 2023

Related U.S. Application Data

(63) Continuation of application No. PCT/CN2022/072151, filed on Jan. 14, 2022.

(51) Int. Cl.
*G02C 11/00* (2006.01)
*H04R 1/02* (2006.01)
*H04R 1/08* (2006.01)

(52) U.S. Cl.
CPC ............. *G02C 11/10* (2013.01); *H04R 1/028* (2013.01); *H04R 1/08* (2013.01)

(58) Field of Classification Search
CPC .......... G02C 11/10; H04R 1/08; H04R 1/105; H04R 1/10; H04R 5/027; H04R 5/0335
USPC ....................................................... 351/158
See application file for complete search history.

(56) References Cited

U.S. PATENT DOCUMENTS

| | | | |
|---|---|---|---|
| 6,091,832 A | 7/2000 | Shurman et al. | |
| 6,176,576 B1 * | 1/2001 | Green | G02C 11/10 351/158 |
| 7,500,746 B1 | 3/2009 | Howell et al. | |
| 10,631,073 B2 | 4/2020 | Schipper | |
| 11,223,889 B2 | 1/2022 | Provost et al. | |
| 2003/0067585 A1 * | 4/2003 | Miller | G02C 11/10 351/123 |

(Continued)

FOREIGN PATENT DOCUMENTS

| | | |
|---|---|---|
| CN | 203720476 U | 7/2014 |
| CN | 106226920 A | 12/2016 |

(Continued)

OTHER PUBLICATIONS

The Extended European Search Report in European Application No. 22822843.3 mailed on Sep. 25, 2023, 7 pages.

(Continued)

*Primary Examiner* — William R Alexander
(74) *Attorney, Agent, or Firm* — METIS IP LLC

(57) ABSTRACT

The present disclosure provides a wearable device, the wearable device comprising a deflector structure configured to be worn on a head of a user, wherein the deflector structure may include a first connecting section, a second connecting section, and a concave section. The first connecting section, the concave section, and the second connecting section may be connected in sequence. The concave section has a downward depression relative to the deflector structure. A first microphone may be configured to collect a sound signal, the first microphone may be located at the concave section.

20 Claims, 14 Drawing Sheets

300

(56) References Cited

U.S. PATENT DOCUMENTS

| | | | |
|---|---|---|---|
| 2003/0068057 A1* | 4/2003 | Miller | G02C 11/10 |
| | | | 455/100 |
| 2008/0008344 A1* | 1/2008 | Wakabayashi | G02C 11/06 |
| | | | 381/327 |
| 2013/0142351 A1 | 6/2013 | Andersen | |
| 2013/0208923 A1 | 8/2013 | Suvanto | |
| 2017/0134550 A1 | 5/2017 | Warren | |
| 2017/0366889 A1 | 12/2017 | Schipper | |
| 2019/0113774 A1* | 4/2019 | Anderson | G02B 27/017 |
| 2019/0253547 A1* | 8/2019 | Kunimoto | H04R 1/10 |
| 2020/0389716 A1* | 12/2020 | Mehra | H04R 1/10 |
| 2021/0116719 A1 | 4/2021 | Wang et al. | |
| 2021/0271115 A1 | 9/2021 | Zhang et al. | |
| 2022/0113562 A1* | 4/2022 | Anderson | G02C 11/06 |
| 2022/0167072 A1* | 5/2022 | Jain | G10K 11/178 |
| 2022/0217461 A1* | 7/2022 | Mehra | H04R 1/24 |
| 2022/0218941 A1* | 7/2022 | Vu | G16H 50/20 |
| 2022/0295167 A1 | 9/2022 | Xu et al. | |

FOREIGN PATENT DOCUMENTS

| | | |
|---|---|---|
| CN | 209233982 U | 8/2019 |
| CN | 110856076 A | 2/2020 |
| CN | 210183483 U | 3/2020 |
| CN | 111562676 A | 8/2020 |
| CN | 212034322 U | 11/2020 |
| CN | 213485164 U | 6/2021 |
| CN | 213547788 U | 6/2021 |
| CN | 113395619 A | 9/2021 |
| CN | 214704204 U | 11/2021 |
| EP | 3445066 A1 | 2/2019 |
| JP | 2017028718 A | 2/2017 |
| RU | 46619 U1 | 7/2005 |
| TW | M601351 U | 9/2020 |
| WO | 2019024394 A1 | 2/2019 |

OTHER PUBLICATIONS

The Office Action in Russian Application No. 2022134447 mailed on Jul. 17, 2023, 14 pages.

First Office Action in Chinese Application No. 202210101579.5 mailed on Mar. 28, 2025, 17 pages.

First Office Action in Chinese Application No. 202210101580.8 mailed on Mar. 28, 2025, 17 pages.

\* cited by examiner

WEARABLE DEVICES

CROSS-REFERENCE TO RELATED APPLICATIONS

This application is a Continuation of International Application No. PCT/CN2022/072151, filed on Jan. 14, 2022, the entire contents of which are incorporated herein by reference.

TECHNICAL FIELD

The present disclosure relates to a technical field of a wearable device, and in particular to a wearable device.

BACKGROUND

As electronic devices become more and more connected to people's lives, many people wear electronic devices with microphones (e.g., headphones, cell phones, smart glasses, etc.) when they are outdoors or playing sports. But when users are running, cycling, and doing other sports, or due to outdoor windy weather, there may be a large airflow speed at the location of the microphone's intake hole in an electronic device, and there may be very obvious wind noise during the call, and even mask the voice content, seriously affecting the call effect and user experience.

Based on the above-mentioned problems, the present disclosure provides a wearable device, which has a better wearing experience as well as a better wind noise reduction effect.

SUMMARY

Embodiments of the present disclosure provide a wearable device comprising: a deflector structure configured to be worn on a head of a user, wherein the deflector structure may include: a first connecting section, a second connecting section, and a concave section, the first connecting section, the concave section, and the second connecting section may be connected in sequence, the concave section having a downward depression region relative to the deflector structure, and a first microphone may be configured to collect a sound signal, the first microphone may be located at the concave section.

In some embodiments, the first microphone may be located at a bottom side of the downward depression region in the concave section.

In some embodiments, the first connecting section may include a first end portion and a second end portion, the second end portion may be connected to the concave section, a height of the first end portion relative to the bottom side of the concave section may be not greater than a height of the second end portion relative to the bottom side of the concave section.

In some embodiments, the second connecting section may include a third end portion and a fourth end portion, the third end portion may be connected to the concave section; a height of the third end portion relative to the bottom side of the concave section may be not less than a height of the fourth end portion relative to the bottom side of the concave section.

In some embodiments, the height of the second end portion relative to the bottom side of the concave section may be not less than the height of the third end portion relative to the bottom side of the concave section.

In some embodiments, the concave section may include a first connecting portion and a second connecting portion, the first connecting portion may be obliquely connected to the first connecting section and extends downward, the second connecting portion may be obliquely connected to the second connecting section and extends downward, an end of the first connecting portion away from the first connecting section may be connected to an end of the second connecting portion away from the second connecting section.

In some embodiments, a distance between the first connecting portion and the second connecting portion may decrease gradually along a depressed direction of the concave section.

In some embodiments, the wearable device further may include a sound conduction structure configured to transmit external sound, the sound conduction structure may be connected to the concave section, the sound conduction structure is an internal through structure, one end of the sound conduction structure may be connected to external environment, and the first microphone may be located at another end of the sound conduction structure.

In some embodiments, a plurality of sound conduction channels may be arranged inside the sound conduction structure and the plurality of sound conduction channels may be obliquely connected in sequence.

In some embodiments, the sound conduction structure may include a cavity, the cavity may be connected to external via a connecting hole.

In some embodiments, the sound conduction structure may include a plurality of cavities, the plurality of cavities may be distributed at intervals along a length direction of the sound conduction structure, adjacent cavities may be connected to each other by a connecting hole; a dimension of the cavity along a width direction of the sound conduction structure may be larger than a dimension of the connecting hole along the width direction of the sound conduction structure.

In some embodiments, the second connecting section may be provided with a second microphone.

In some embodiments, when the wearable device may be worn by the user, a connection line between the first microphone and the second microphone points to a direction of mouth of the user.

In some embodiments, a vibration direction of a diaphragm in the first microphone may be substantially perpendicular to a vibration direction of a diaphragm in the second microphone.

In some embodiments, a distance between the first microphone and the second microphone may be 5 mm-70 mm.

In some embodiments, the wearable device may further include an acoustic output unit, the acoustic output unit may be located at the concave section.

In some embodiments, a vibration direction of a diaphragm of the first microphone may be substantially perpendicular to a vibration direction of a diaphragm of the acoustic output unit.

In some embodiments, the first microphone or the second microphone of the wearable device may be located in an acoustic zero region of the acoustic output unit.

In some embodiments, the deflector structure may include a first deflector structure and a second deflector structure, the first deflector structure and the second deflector structure may be placed on a left ear and a right ear of the user, respectively.

In some embodiments, the device may further include a visual member, the visual member may be connected to a first connecting section of the first deflector structure or the second deflector structure.

DETAILED DESCRIPTION

Figure 1:
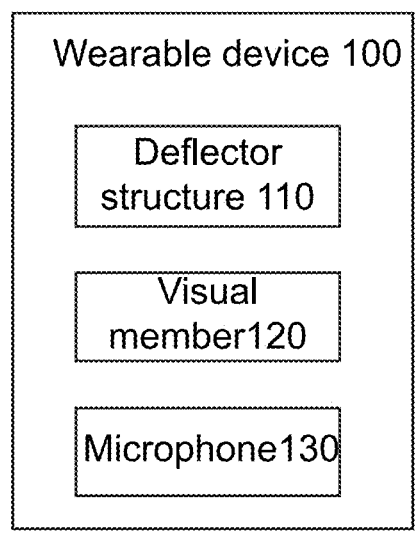
FIG. 1 is a schematic diagram illustrating an exemplary framework of a wearable device according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit" and/or "module" used in this disclosure are a method used to distinguish different components, elements, parts, portions or assemblies of different levels. However, if other words may achieve the same purpose, the words may be replaced by other expressions.

As used in the disclosure and the appended claims, the singular forms "a," "an," and "the" include plural referents unless the content clearly dictates otherwise. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

Embodiments of this present disclosure describe a wearable device. In some embodiments, the wearable device may include a deflector structure configured to be worn on the head of a user. For example, when the wearable device is eyewear, the deflector structure may be an eyewear leg or a partial structure thereof. In some embodiments, the deflector structure may include a first connecting section, a second connecting section, and a concave section. The first connecting section, the concave section, and the second connecting section may be connected in sequence. The concave section may be located between the first connecting section and the second connecting section, wherein the concave section has a downward depression relative to the deflector structure. In some embodiments, the wearable device may further include a first microphone configured to collect a sound signal generated when the user speaks, the first microphone may be located at the concave section. In some embodiments, the first microphone may be located inside the concave section, and the first microphone may pick up, through a sound inlet hole at the concave section, the sound signal when the user speaks. In some embodiments, the wearable device may be an electronic device with audio functions (e.g., glasses, a smart helmet, etc.). When the user wears the wearable device for sports or in windy weather, the deflector structure may change an airflow direction and generate a low-flow rate region in the concave section that is depressed downward relative to the deflector structure. Setting the first microphone or the sound inlet hole at the concave section can significantly reduce the impact of external airflow on the microphone, thus ensuring the quality of the sound signal when the first microphone collects the user's speech and improving the user experience. On the one hand, the deflector structure in the wearable device provided by embodiments of this present disclosure has a better wind-noise canceling effect, for example, the noise reduction effect of conventional multi-microphone arrays or bone conduction microphones can be achieved by using only dual air-conduction microphones. On the other hand, the small size of the wearable device provided by the embodiments of this present disclosure only requires a portion of the structure of the wearable device (e.g., the mirror legs) to be adjusted to a similar structure of the deflector structure. In addition, the wearable device provided by the embodiment of this present disclosure reduces wind noise by physical means, which is less damaging to the voice signal (e.g., the voice signal when the user is speaking) and leaves more room for subsequent algorithmic processing.

FIG. 1 is a diagram illustrating an exemplary framework of a wearable device according to some embodiments of the present disclosure. As shown in FIG. 1, the wearable device 100 may include a deflector structure 110, a visual member 120, and a microphone 130.

In some embodiments, the wearable device 100 may include glasses, a smart bracelet, headphones, hearing aids, a smart helmet, a smart watch, smart clothing, a smart backpack, smart accessories, etc., or any combination thereof. For example, the wearable device 100 may be a functional device such as myopia glasses, presbyopic glasses, cycling glasses or sunglasses, etc. The wearable device 100 may also be intelligent eyewear, such as audio glasses with headphone functions. The wearable device 100 may also be a headset, Augmented Reality (AR) device, Virtual Reality (VR) device, and other head-mounted devices. In some embodiments, the augmented reality device or virtual reality device may include a virtual reality headset, virtual reality glasses, an augmented reality headset, augmented reality glasses, etc., or any combination thereof. For example, the virtual reality device and/or augmented reality device may include Google Glass, Oculus Rift, Hololens, Gear VR, etc.

The deflector structure 110 may be a component worn on the head of the user. In some embodiments, the deflector structure 110 may be a component such as a mirror leg or headband. For example, if the deflector structure 110 is a mirror leg, the wearable device 100 may include a visual member 120 and two deflector structures 110, and the two deflector structures 110 may be attached with the two ends of the visual member and placed on the corresponding left and right ears, respectively. For example, if the deflector structure 110 is a headband-type component, the headband-type component may be adjusted to fit the head shape of the user, and a variety of functional components may also be provided thereon, then the wearable device 100 may include one visual member and one deflector structure 110, and the two ends of the deflector structure 110 may be connected to the two ends of the visual member. It should be noted that the structure of the deflector structure 110 may be adapted according to the type of wearable device 100 or the specific application scenario. In some embodiments, the deflector structure 110 may include a first connecting section, a second connecting section, and a concave section, wherein the first connecting section, the concave section, and the second connecting section may be connected in sequence, the concave section may be located between the first connecting section and the second connecting section, and the concave section has a downward depression relative to the deflector structure 110. On the one hand, the deflector structure 110 may serve as a deflector structure for the wearable device 100, through which the wearable device 100 may be worn on the head of the user. On the other hand, the deflector structure 110 may change the airflow direction and generate a low-flow rate region in the concave section depressed downward relative to the deflector structure 110. Setting the microphone 130 in the concave section can significantly reduce the impact of external airflow on the sound signal when the user speaks and improve the user's experience.

In some embodiments, the wearable device 100 may also include a visual member 120. The visual member 120 may be configured to be placed on a part of the user's body, for example, the visual member 120 may be configured to be placed in a position such as the eye. The deflector structure 110 may be connected to one or both ends of the visual member 120 for keeping the wearable device 100 in steady contact with the user. In some embodiments, the visible member 120 may be a lens, a display, or a display with a lens effect. In some embodiments, the visible member 120 may also be a lens and its auxiliary components or a display and its auxiliary components, wherein the auxiliary components may be components such as a frame or a holder. In some embodiments, the visible member 120 may also be an auxiliary component that does not contain a lens or display.

The microphone 130 may convert the sound signal into a signal containing sound information. In some embodiments, the microphone 130 may include one or more air conduction microphones. In some embodiments, the microphone 130 may include one or more bone conduction microphones. In some embodiments, the microphone 130 may include a combination of both one or more air conduction microphones and one or more bone conduction microphones. In some embodiments, when the count of microphones 130 is multiple, at least one microphone (e.g., a first microphone) may be located at the concave section of the deflector structure 110, or the corresponding sound inlet hole of the microphone may be located at the concave section of the deflector structure, and the concave section may provide a low-flow rate region, and the location of the microphones 130 in the low-flow rate region can significantly reduce the impact of external airflow on the sound signal when the user speaks and improve the user's experience. In some embodiments, the microphone 130 may also be located at another location of the deflector structure 110, for example, at a second connecting section of the deflector structure 110. In some embodiments, the microphone 130 may be provided on the external surface of the deflector structure 110 or on the internal of the deflector structure 110. For example, the microphone 130 may be provided at a location on the external surface of the deflector structure 110 near the mouth of the user. As another example, the deflector structure 110 may include a cavity for housing the microphone 130, the cavity may be connected to the external environment through a sound inlet hole, at least a portion of the microphone 130 may be housed in the cavity, and the microphone 130 may pick up the external sound signal through the sound inlet hole. As a further example, the microphone 130 and the deflector structure 110 may be of an integral part. In some embodiments, the type of microphone 130 may include at least one of a dynamic microphone, a condenser microphone, an aluminum ribbon microphone, a piezoelectric microphone, a vacuum tube microphone, etc.

In some embodiments, the wearable device 100 may also include an acoustic output unit (not shown in FIG. 1). The acoustic output unit may be configured to convert a signal containing sound information into a sound signal. In some embodiments, the acoustic output unit may include one or more air conduction speakers. In some embodiments, the acoustic output unit may include one or more bone conduction speakers. In some embodiments, the acoustic output unit may include a combination of both one or more bone conduction speakers and one or more air conduction speakers. In some embodiments, the acoustic output unit may be provided at the deflector structure 110 to facilitate the delivery of the emitted sound to the user. In some embodiments, the acoustic output unit may be provided at an end of the deflector structure 110 or at any other location. For example, the acoustic output unit may be provided at the end of the deflector structure 110, while no other acoustic output unit is not provided at other locations of the deflector structure 110. In some embodiments, the plurality of acoustic output units may be provided at a plurality of locations in the deflector structure 110. For example, at least one acoustic output unit is provided at both the end or other locations of the deflector structure 110. In some embodiments, the acoustic output unit may be provided on the external surface of the deflector structure 110 or on the internal of the deflector structure 110. For example, the acoustic output unit may be provided close to the location where the deflector structure 110 is in contact with the user (e.g., on the deflector structure 110 near the temple to the ear). As another example, the deflector structure 110 may include a cavity for housing the acoustic output unit, and at least a portion of the acoustic output unit may be housed in the cavity. As a further example, the acoustic output unit and the deflector structure 110 may be an integral part. It should be noted that when the acoustic output unit is a bone conduction speaker, the acoustic output unit may produce air conduction sound waves while outputting mechanical vibrations (i.e., bone conduction sound waves). The process of the above conversion may involve the coexistence and conversion of many different types of energy. For example, an electrical signal (i.e., a signal containing sound information) may be directly converted into mechanical vibrations by a vibration member of the acoustic output unit, which conducts mechanical vibration through a vibration transmission element to transmit sound waves. In some embodiments, the type of acoustic output unit may include one or more of moving coil, electrostatic, piezoelectric, moving iron, pneumatic, electromagnetic, etc.

It should be understood that the framework diagram provided in FIG. 1 is for illustrative purposes only and is not intended to limit the scope of the present disclosure. For those skilled in the art, various variations and modifications can be made under the guidance of this present disclosure. And these deformations and modifications will fall within the scope of the present disclosure. In some embodiments, the count of elements shown in the figures can be adjusted according to the actual situation. In some embodiments, one or more of the elements shown in FIG. 1 may be omitted, or one or more other elements may be added or removed. For example, the wearable device 100 may also include an acoustic output unit. In some embodiments, a component may be replaced by other components capable of performing similar functions. In some embodiments, one component may be split into a plurality of sub-components, or a plurality of components may be merged into a single component.

Figure 2:
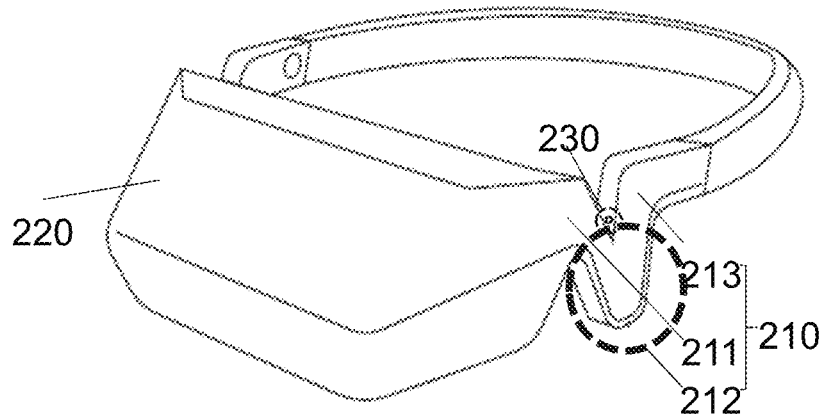
FIG. 2 is a schematic diagram illustrating a structure of a wearable device according to some embodiments of the present disclosure.

To further describe the wearable device, the following description describes an exemplary wearable device. FIG. 2 is a schematic diagram illustrating a structure of a wearable device according to some embodiments of the present disclosure. The wearable device 200 shown in FIG. 2 is a VR device or an AR device, and as shown in FIG. 2, the wearable device 200 may include a deflector structure 210, a visual member 220, and a first microphone 230. In some embodiments, the deflector structure 210 may be a headband-type component, and the deflector structure 210 may be a structure made of resilient material or a structure with an adjustable length. The two ends of the deflector structure 210 may be connected to the two ends of the visual member 220, and when the user wears the wearable device 200, the deflector structure 210 and the visual member 220 may surround the head of the user, and the wearable device 200 may be worn through the pressure of the deflector structure 210 and the visual member 220 on the head of the user. In some embodiments, the connection between the deflector structure 210 and the visible member 220 may include, but is not limited to, a movable connection, such as a rotating connection or a telescoping connection, or a relatively fixed connection such as a snap, screwed or one-piece molded connection.

In some embodiments, the deflector structure 210 may include a first connecting section 211, a concave section 212, and a second connecting section 213 connected in sequence, wherein one end of the first connecting section 211 may be connected to the visible member 220, another end of the first connecting section 211 may be connected to the concave section 212, and the second connecting section 213 may be connected to the end of the concave section 212 that is away from the visible member 220. It should be noted that when the deflector structure 210 is a headband-type component, the second connecting section 213 may be a structure similar to a headband to wrap around the head of the user. Alternatively, the second connecting section 213 may be a structure independent from the headband, for example, the headband may be detachably connected to (e.g., clamped on, bonded to, etc.) the second connecting section 213. When the user wears the wearable device 200, the concave section 212 may be located near the user's ear (e.g., front side, upper side, etc.), which allows the first microphone 230 to be located close to the user's mouth for easy reception of the sound signal when the user speaks. On the other hand, when the wearable device 200 includes an acoustic output unit, the acoustic output unit can be located close to the user's ear without blocking the user's ear canal opening, so that the user can hear the sound from the acoustic output unit while also receiving the sound from the external environment. As shown in FIG. 2, the region of the concave section 212 that is depressed downward relative to the deflector structure 210 has a relatively low airflow rate relative to other locations (e.g., the first connecting section 211, the second connecting section 213, or the external environment). In order to reduce the effect of external airflow on the first microphone 230, in some embodiments, the first microphone 230 may be located inside the concave section 212, with the sound inlet hole opened in the side wall corresponding to the depression region, and the first microphone 230 picks up the external sound signal through the sound inlet hole. For example, the concave section 212 has a cavity inside that is connected to the external environment through a sound inlet hole, and the first microphone 230 or its components (e.g., a diaphragm, a transducer, etc.) may be located in this cavity, at which point the lower concave section 212 may be considered a housing structure for the first microphone. The airflow rate may be lower when the distance from downward depression region of the concave section 212 to the top of the deflector structure 210 is increased. To improve the quality of the sound signal collected by the first microphone 230 when the user is speaking, in some embodiments, the sound inlet hole may be located at the bottom side of the downward depression region in the concave section 212. In some embodiments, the first microphone 230 may also be located in an external region of the concave section 212. For example, the first microphone 230 may be a relatively independent structure relative to the concave section 212, with the housing structure of the first microphone 230 connected to the side wall of the concave section 212. In some embodiments, a sound inlet hole may be opened in the housing structure of the first microphone 230 to allow the internal elements of the first microphone 230 to pick up external sound signals, and descriptions about the location of the sound inlet hole opened in the housing structure of the first microphone 230 may refer to the contents about the sound inlet hole in the side wall of the concave section 212 described above.

It should be noted that the first microphone 230 can be a single microphone or a microphone array consisting of multiple microphones. In addition, the wearable device 200 may include microphones other than the first microphone 230, such as a second microphone, a third microphone, etc. The other microphones may be located at other parts of the inflow structure 210, for example, the other microphones may be located at the second connection segment 213 of the deflector structure, and the multiple microphones (e.g., dual microphones, triple microphones, etc.) on the wearable device 200 may further improve the call noise reduction effect.

Figure 3:
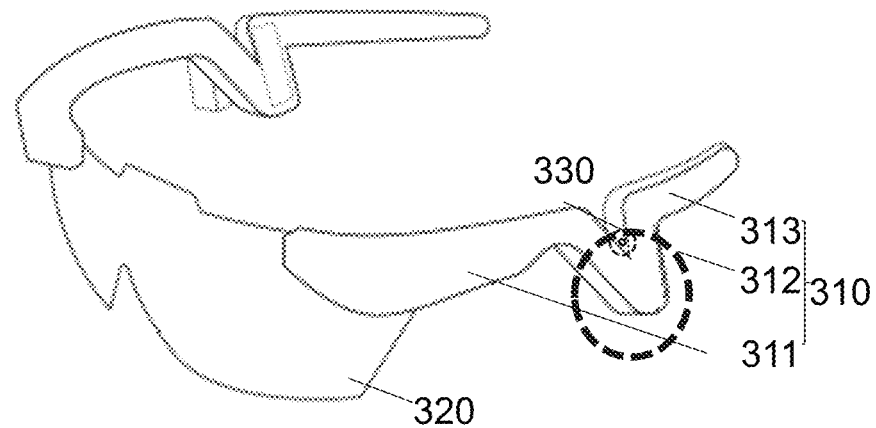
FIG. 3 is a schematic diagram illustrating a structure of another wearable device according to some embodiments of the present disclosure.

FIG. 3 is a schematic diagram illustrating a structure of another wearable device according to some embodiments of the present disclosure. The wearable device 300 shown in FIG. 3 may be an eyewear, and as shown in FIG. 3, the wearable device 300 may include two deflector structures 310, a visual member 320 (i.e., frames or lenses), and a first microphone 330. In some embodiments, the deflector structure 310 may be considered as a mirror leg structure, with one end of the deflector structure 310 (i.e., a first connector 311) connected to the end of the visible member 320, and two second connector segments 313 of the deflector structure 310 matching with the user's left and right ears, respectively. When the user wears the wearable device 300, the deflector structure 310 may be supported by the user's ears and the visual member 320 may be supported by the user's nose. In some embodiments, a connection manner of the deflector structure 310 to the visible member 320 may include, but is not limited to, a movable connection such as a rotating connection or a telescoping connection, or a relatively fixed connection such as a snap, screwed or one-piece molded connection. The structure of the first connecting section 311, the concave section 312, and the first microphone 330 shown in FIG. 3 may be similar to the structure of the first connecting section 211, the concave section 212, and the first microphone 230 shown in FIG. 2, and may not be described herein.

It should be noted that the above description of the wearable device 200 and the wearable device 300 is for example and illustration purposes only and does not limit the scope of application of this present disclosure. For those skilled in the art, various corrections and changes can be made to the wearable device 200 and the wearable device 300 under the guidance of this present disclosure. However, these corrections and modifications are still within the scope of the present disclosure. For example, the deflector structure 210 of the wearable device 200 may be a mirror leg structure, and the deflector structure 310 of the wearable device 300 may be a headband-type component.

Figure 4:
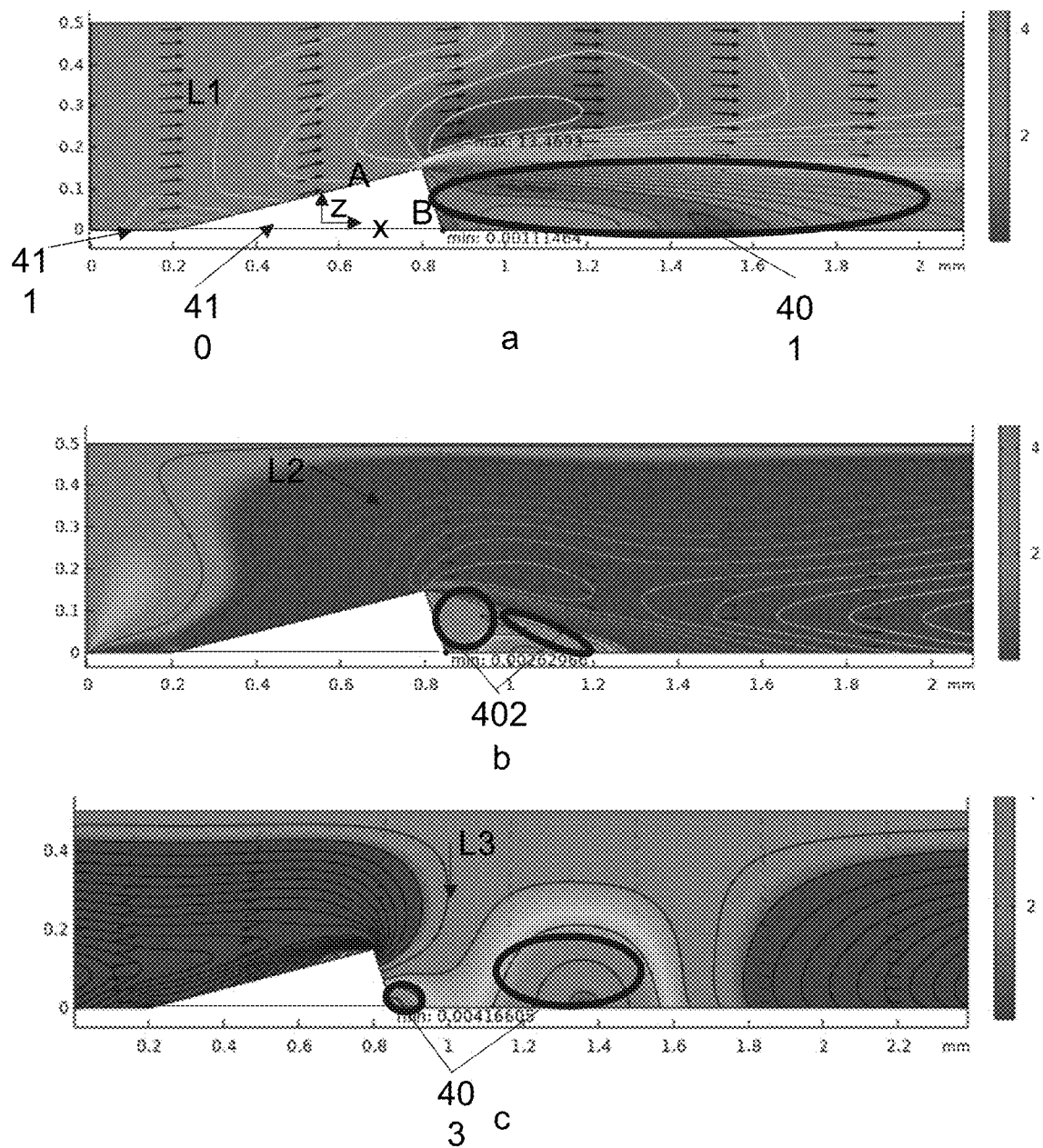
FIG. 4 is a schematic diagram illustrating flow fields of different airflow directions according to some embodiments of the present disclosure.
Figure 5:
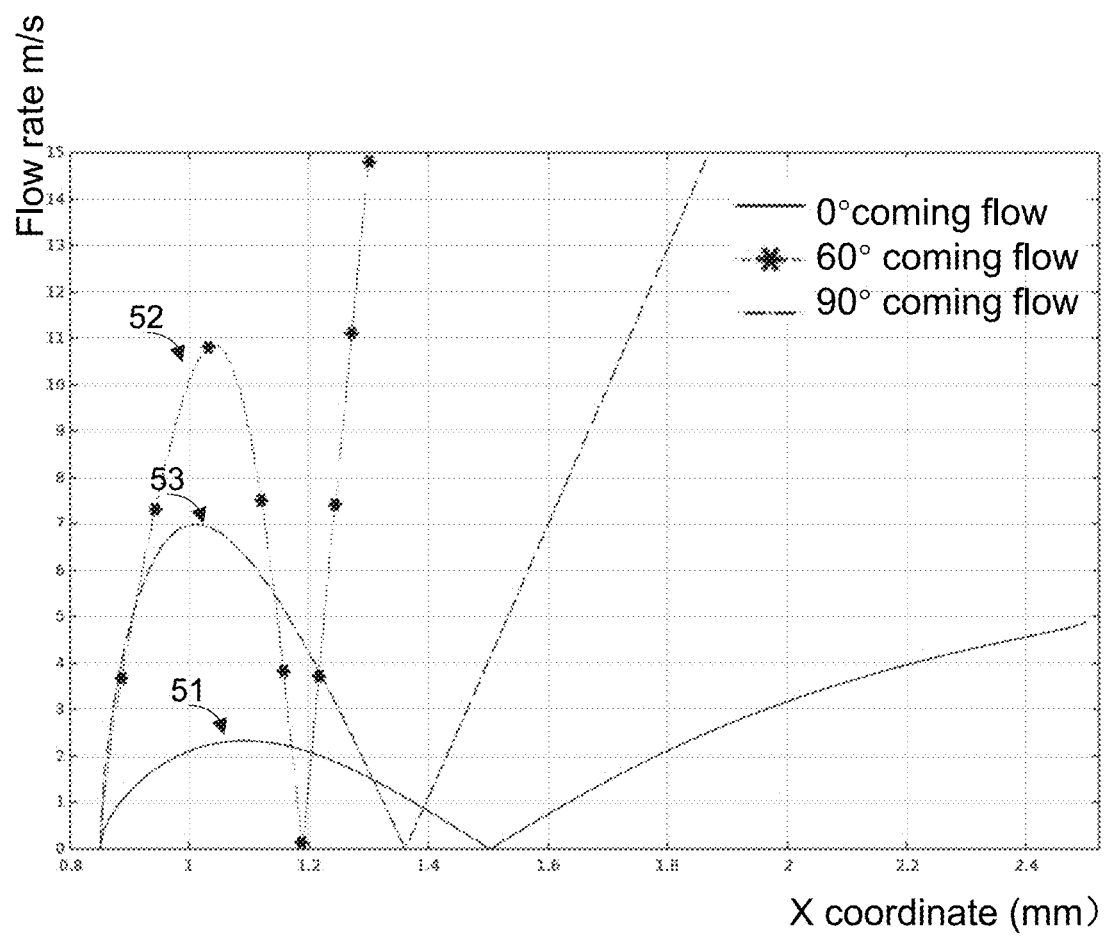
FIG. 5 is a schematic diagram illustrating a flow rate variation curve according to some embodiments of the present disclosure.

To further illustrate that the deflector structure can provide a stable low-flow rate region, FIGS. 4 and 5 are provided. FIG. 4 is a schematic diagram illustrating flow fields of different airflow directions according to some embodiments of the present disclosure By way of illustration only, as shown in FIG. 4, in some embodiments, a height of a deflector structure 410 may gradually increase, and then gradually decrease along the length of the deflector structure 410 (in a direction of the arrow x in the image a in FIG. 4), and the slope of a plane having a gradually increasing height (plane A shown in the image a in FIG. 4, hereinafter referred to as plane A) in the deflector structure 410 may be less than the slope of a plane having a gradually decreasing height (plane B shown in the image a in FIG. 4, hereinafter referred to as plane B). The height of the deflector structure 410 may refer to a height of the deflector structure 410 in the z-direction relative to a reference plane 411. The slope may refer to a ratio of the height of the plane of the deflector structure 410 relative to the reference plane 411 to the distance in the horizontal direction.

As shown in the image a in FIG. 4, the deflector structure 410 may be set along a flow direction L1 of the airflow, where the flow rate of the airflow is 10 m/s, and the length direction of the deflector structure 410 may be the same as the flow direction L1 of the airflow, which can also be understood as an angle between the flow direction L1 of the airflow and the reference plane 411 is 0°. The deflector structure 410 may change the flow direction of the airflow, when the airflow first flows along the external surface of the gradually increasing height part of a raised structure 412, the height of the deflector structure 410 with the gradually increasing part can ensure a relatively smooth flow of airflow and prevent the airflow from generating eddy currents and introducing additional noise. Since the slope of the plane B in the deflector structure 410 is greater than the slope of the plane A, when the airflow passes the highest point of the deflector structure 410, the height of the deflector structure 410 changes abruptly, so that the airflow does not flow along the plane B of the deflector structure 410, but flows along the length of the deflector structure 410, which in turn forms a low flow rate region 401 in the deflector structure 410. As seen in the image a in FIG. 4, under the condition of 10 m/s incoming flow rate, the 0.15 mm height of the deflector structure 410 along the length of the deflector structure 410 can ensure that the flow rate in the region of about 1.5 mm after it is less than 2 m/s.

As shown in the image b in FIG. 4, when an angle between the flow direction L2 of the airflow and the reference plane 411 is 60°, a low flow rate region 402 may be formed along the length of the deflector structure 410 in a region of about 0.4 mm after the deflector structure 410. A length range of the low-flow rate region 402 may be significantly reduced relative to the length range of the low-flow rate region 401 in the image a in FIG. 4, and there may also be a relatively high-speed reflux region in it. As shown in FIG. 4C, when an angle between the flow direction L3 of the airflow and the reference plane is 90°, a low flow rate region 403 may be formed after the deflector structure 410 along the length of the deflector structure 410.

FIG. 5 is a schematic diagram illustrating a flow rate variation curve according to some embodiments of the present disclosure. As shown in FIG. 5, the horizontal coordinate ("x-coordinate (mm)" shown in FIG. 5) may correspond to the horizontal coordinate in FIG. 4, and the vertical coordinate may indicate an airflow rate (m/s) relative to the different locations. A curve 51 (a curve labeled "0° incoming flow" in FIG. 5) may refer to a flow rate variation curve at different locations when the angle between the flow direction and the reference surface 411 is 0°, a curve 52 (a curve labeled "60° incoming flow" in FIG. 5) may refer to a flow rate variation curve at different locations when the angle between the flow direction and the reference surface 411 is 60°, and a curve 53 (the curve labeled "90° incoming flow" in FIG. 5) may refer to a flow rate variation curve at different locations when the angle between the flow direction and the reference surface 411 is 90°. As shown in FIG. 5, when the angle between the flow direction of the airflow (e.g., the flow direction L1 of the airflow in the image a in FIG. 4) and the reference plane 411 is 0°, the horizontal coordinate may be within a range of 0.8 mm-1.8 mm, which indicates a low-flow rate (e.g., less than 2.2 m/s), wherein the very small values of the airflow rate are at 0.8 mm-0.85 mm and 1.4-1.6 mm in the x coordinate. When the flow direction of the airflow (for example, the flow direction L1 of the airflow in FIG. 4, FIG. b) has an angle of 60° with the reference plane 411, wherein the minimum value of the airflow rate may be at 0.8 mm-0.85 mm and 1.1-1.2 mm in the x coordinate. When the angle of the flow direction of the airflow and the reference plane 411 is 90°, the minimum value of the airflow rate may be at 0.8 mm-0.85 mm and 1.2-1.4 mm in the x coordinate.

As shown in FIG. 4 and FIG. 5, the deflector structure 410 may provide a corresponding low-flow rate region when facing airflow in different incoming directions. However, the location of the low-flow rate region (e.g., less than 2.2 m/s) in the deflector structure 410 has some variability when facing airflow in different incoming directions. In some embodiments, the mounting location of the microphone or the sound inlet hole corresponding to the microphone may be adapted to the different application scenarios of the wearable device. For example, when a user wears a wearable device for running or cycling, the direction of external airflow may be mainly in the direction opposite to the user's movement. At this time, the deflector structure 410 can be specifically set, for example, the height direction of the deflector structure (e.g., a direction of the arrow y shown in the image a in FIG. 4) may be perpendicular or approximately perpendicular to the direction of the user's movement, thereby ensuring that the inlet aperture corresponding to the microphone is in the low-flow rate region.

In order to ensure that the microphone is in the low-flow rate region in different incoming flow directions, the present disclosure also provides a deflector structure in FIGS. 6 to 12 and their corresponding contents.

Figure 6:
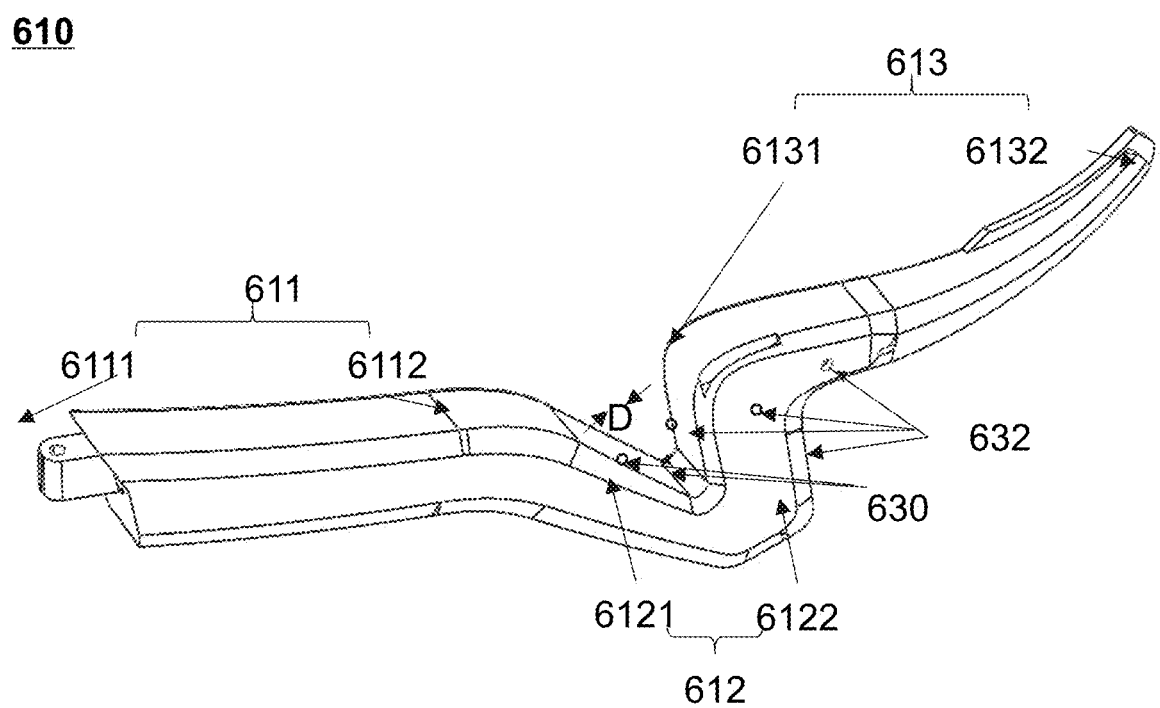
FIG. 6 is a schematic diagram illustrating a deflector structure according to some embodiments of the present disclosure.

FIG. 6 is a schematic diagram illustrating a deflector structure according to some embodiments of the present disclosure. As shown in FIG. 6, the deflector structure 610 may include a first connecting section 611, a concave section 612, and a second connecting section 613 connected in sequence, wherein the concave section 612 has a downward depression region relative to the deflector structure 610. In some embodiments, the first connecting section 611 and the second connecting section 613 may have rod-like structures. The first connecting section 611 may include a first end portion 6111 and a second end portion 6112. The first end portion 6111 may be configured to connect to the visible member of the wearable device, and the second end portion 6112 may be connected to the end of the concave section 612 away from the second connecting section 613. The second connecting section 613 may include a third end portion 6131 and a fourth end portion 6132. The third end portion 6131 may be connected to an end of the concave section 612 away from the first connecting section 611. In some embodiments, the concave section 612 may include a first connecting portion 6121 and a second connecting portion 6122, the first connecting portion 6121 may be obliquely connected to the second end portion 6112 of the first connecting section 611 and extending downward, the second connecting portion 6122 may be obliquely connected to the third end portion 6131 of the second connecting section 613 and extending downward, the end of the first connecting portion 6121 away from the first connecting section 611 may be connected to the end of the second connecting portion 6122 away from the second connecting section 613, thereby forming a region having a downward depression region relative to the deflector structure 610. To ensure that the depression region of the concave section 612 can provide a more stable low-flow rate region at the corresponding sound inlet hole of the microphone, in some embodiments, a distance between the first connecting portion 6121 and the second connecting portion 6122 may decrease gradually along a depressed direction of the concave section 612. The distance between the first connecting portion 6121 and the second connecting portion 6122 may be a distance between the sidewalls positioned opposite each other in the first connecting portion 6121 and the second connecting portion 6122 along the length of the deflector structure 610 (characterized by the "D" shown in the figure). In some embodiments, the shape of the concave section 612 formed by the first connecting portion 6121 and the second connecting portion 6122 may be other shapes such as a circular arc, a quadrilateral (e.g., an inverted trapezoid), a V-shape, etc. It should be noted that the shape of the lower concave section 612 is not limited to the above-mentioned shape, but can be any shape that can achieve that the first connecting portion 6121 and the second connecting portion 6122 form a downward depression region relative to the deflector structure 610. For more information about the specific shape of the concave section 612, please refer to FIG. 7 and relevant descriptions.

One or more downward depression regions relative to the deflector structure 610 may be formed in the deflector structure 610 by providing a first connecting section 611, a second connecting section 613, and a concave section 612, which may provide a stable low-flow rate region in a particular airflow direction. For example, when the air flow direction is parallel to the length direction of the deflector structure 610, the first connecting section 611 of the deflector structure 610 may direct the air to a position higher than the deflector structure 610, so that the depression region at the concave section 612 is a low-flow rate region. As another example, when the air flow direction is perpendicular to the length direction of the deflector structure 610, the air flow may flow out from both sides of the concave section 612 that are perpendicular to the length direction of the vertical deflector structure 610 due to the action of the concave section 612, and the bottom side of the depression region in the concave section 612 may be a stagnant region of the air flow. Setting the first microphone corresponding to the first sound inlet hole 630 at this region can reduce the influence of external airflow on the first microphone. In some embodiments, the first microphone may be located inside the concave section 612. For example, the concave section 612 has a cavity that is connected to the external environment through a first sound inlet hole 630, and the components of the first microphone (e.g., a diaphragm, a transducer, etc.) may be located in this cavity, and the lower concave section 212 may be considered a housing for the first microphone. In some embodiments, the first microphone may be a separate component relative to the concave section 612. For example, the first microphone may include a housing, which is connected to the concave section 612, and the diaphragm, the transducer, and other components of the first microphone are located in the housing, which may include a first sound inlet hole 630 through which external sound may act on the diaphragm of the first microphone. The further the location of the depression region of the concave section 612 is from the top of the deflector structure 610, the lower the airflow rate. In order to improve the quality of the sound signal collected by the first microphone when the user is speaking, in some embodiments, the first sound inlet hole 630 corresponding to the first microphone may be located on the side wall corresponding to the depression region. Preferably, the first microphone corresponding to the first sound inlet hole 630 may be located at the bottom side of the depression region in the concave section 612. In some embodiments, the first microphone may be made less susceptible to external airflow by adjusting the height of the first sound inlet hole 630 relative to the bottom side of the depression region. In some embodiments, a ratio of a distance from the first sound inlet hole 630 to the bottom side of the depression region to a distance from the second end portion 6112 to the bottom side of the depression region may range from 0-1. Preferably, the ratio of the distance from the first sound inlet hole 630 to the bottom side of the depression region to the distance from the second end portion 6112 to the bottom side of the depression region may range from 0-0.8. Further preferably, the ratio of the distance from the first sound inlet hole 630 to the bottom side of the depression region to the distance from the second end portion 6112 to the bottom side of the depression region may range from 0-0.5. More preferably, the ratio of the distance from the first sound inlet hole 630 to the bottom side of the depression region to the distance from the second end portion 6112 to the bottom side of the depression region may range from 0-0.2. It should be noted that the distance from the first sound inlet hole 630 to the bottom side of the depression region may be a minimum distance from the first sound inlet hole 630 to the plane where the bottom part of the depression region is located when the user is wearing the wearable device. The distance from the second end portion 6112 to the bottom side of the depression region is the distance from the highest point of the second end portion 6112 to the plane where the bottom side of the depression region is located when the wearable device is worn by the user. It should be noted that in some embodiments, the bottom side of the depression region may be a flat, convex, concave or irregular surface. When the bottom side of the depression region is non-planar, the plane where the bottom side of the depression region is located may be determined by connecting the boundaries of the bottom side of the first connecting portion 6121 with the second connecting portion 6122 and the depression region.

In some embodiments, the wearable device may also include one or more second microphones, and a second sound inlet hole 632 corresponding to the second microphone(s) may be located at the second connecting section 613. In some embodiments, the second sound inlet hole 632 corresponding to the second microphone(s) may also be located at the second connecting portion 6122 of the concave section 612. For example, the second sound inlet hole 632 corresponding to the second microphone(s) may be located on the side wall of the depression region corresponding to the second connecting portion 6122. As another example, the second microphone 623 may be located on the side of the second connecting portion 6122 that is back away from the depression region.

Figure 7:
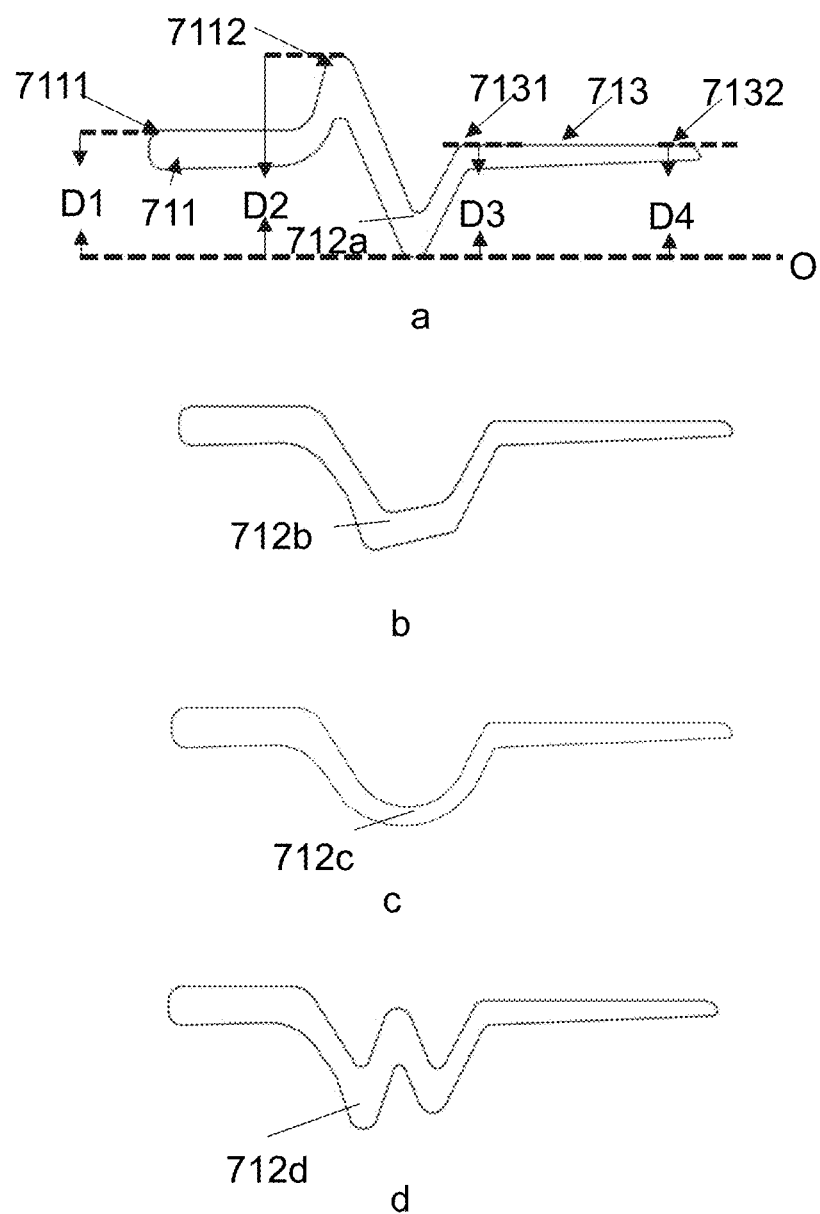
FIG. 7 is a schematic diagram illustrating a structure of a deflector structure according to some embodiments of the present disclosure.

FIG. 7 is a schematic diagram illustrating a structure of a deflector structure according to some embodiments of the present disclosure. In the deflector structure in the image a in FIG. 7, a concave section 712a has an approximate V-shaped structure. In order to direct airflow from the external environment to a location above the depression region of the concave section 712a, in some embodiments, the height of the first end portion 7111 of the first connecting portion 711 relative to the bottom side of the concave section 712a may be not greater than the height of the second end portion 7112 relative to the bottom side of the concave section 712a. The height of the first end portion 7111 relative to the bottom side of the concave section 712a may refer to a distance D1 between the upper end face of the first end portion 7111 and the plane in which the bottom side of the concave section 712a is located. The height of the second end portion 7112 relative to the bottom side of the concave section 712a may refer to a distance D2 between the upper end face of the second end portion 7112 and the plane in which the bottom side of the concave section 712a is located. The plane in which the bottom side of the concave section 712 is located (indicated by a dotted dashed line O in FIG. 7a, hereinafter referred to as plane O) may be parallel or approximately parallel to the direction of the length of the deflector structure. In some embodiments, a height of the third end portion 7131 relative to the bottom side of the concave section 712a may be not less than a height of the fourth end portion 7132 relative to the bottom side of the concave section 712a. The height of the third end portion 7131 relative to the bottom side of the concave section 712a may be a distance D3 between the upper end face of the third end portion 7131 and the plane (i.e., the plane O) in which the bottom side of the concave section 712a is located. The height of the fourth end portion 7132 relative to the bottom side of the concave section 712a may be a distance D4 between the upper end face of the fourth end portion 7132 and the plane (i.e., the plane O) in which the bottom side of the concave section 712a is located. When the external airflow passes through the second end portion 7112, in order to prevent the airflow from being blocked by the third end portion 7131 and entering the depression region, in some embodiments, a height of the second end portion 7111 relative to the bottom side of the concave section 712a may be not less than the height of the third end portion relative to the bottom side of the concave section, that is, the distance D2 is not less than the distance D3.

The deflector structures shown in images b, c, and d in FIG. 7 may be substantially the same as those in the image a in FIG. 7, and the difference is the deflector structures in the images b, c, and d have different concave sections. As the deflector structure shown in the image b in FIG. 7, the concave section 712b has structure similar to an inverted trapezoid, such that the concave section 712b forms a low flow rate region similar to the inverted trapezoidal region. As the deflector structure shown in the image c in FIG. 7, if the concave section 712c is circular, the concave section 712c may form a circular low-flow rate region. As the deflector structure shown in the image d in FIG. 7, if the concave section 712d is a W-like structure, the concave section 712d may form a W-like low-flow rate region. For more information about the first connecting section, the second connecting section, and the height between their ends and the base in FIGS. 7B-7D, please refer to descriptions about the image a in FIG. 7 above.

Figure 8:
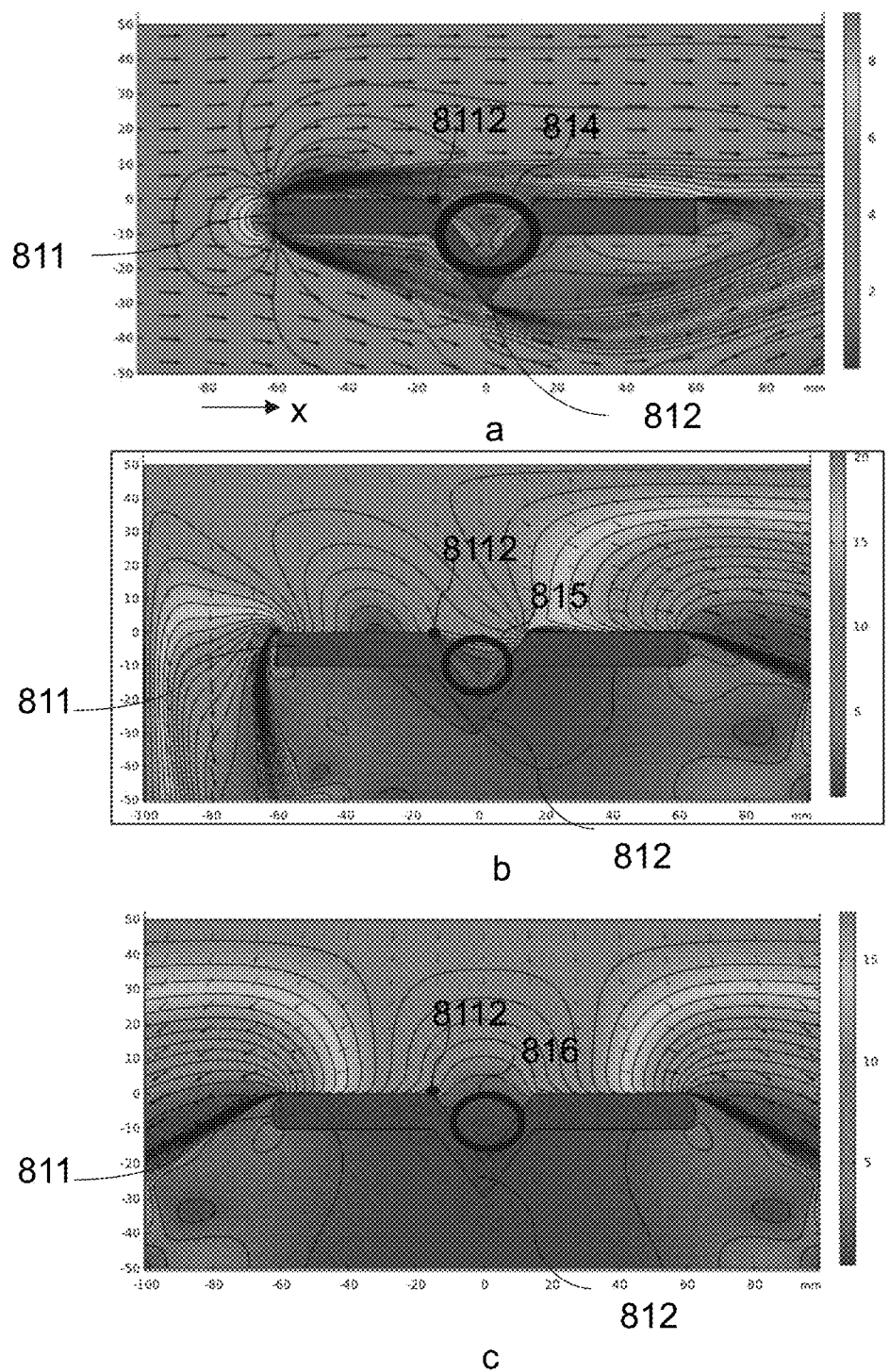
FIG. 8 is a schematic diagram illustrating flow fields of different flow directions according to some embodiments of the present disclosure.

To further illustrate that the deflector structure can provide a stable low-flow rate region in various airflow directions, FIGS. 8 to 12 are provided. FIG. 8 is a schematic diagram illustrating flow fields of different flow directions according to some embodiments of the present disclosure. The following descriptions take a concave section having a V-shaped structure as an example. As shown in the image a in FIG. 8, the deflector structure is set along the flow direction of the airflow, wherein the flow rate of the airflow is 10 m/s, and the length direction of the deflector structure is the same as the flow direction of the airflow. The first connecting section 811 of the deflector structure may change the flow direction of the airflow, and the flow direction of the airflow changes under the action of the first end of the first connecting section 811. A portion of the airflow acting on the first end of the first connecting section 811 flows along the location above the first connecting section 811, continues to flow in the direction of the length of the deflector structure when it passes through the concave section 812 and forms a low flow rate region 814 in the depression region of the concave section 812. As shown in the images b and c in FIG. 8, when an angle between the flow direction of the airflow and the length direction of the deflector structure is 60° and 90°, respectively, the airflow may flow out from both sides of the concave section 812 that are perpendicular to the length direction of the deflector structure due to the action of the concave section 812, and the bottom side of the depression region in the concave section 812 is the stagnant region of the airflow (e.g., the region 815 shown in the image b in FIG. 8 and the region 816 shown in the image c in FIG. 8).

Figure 9:
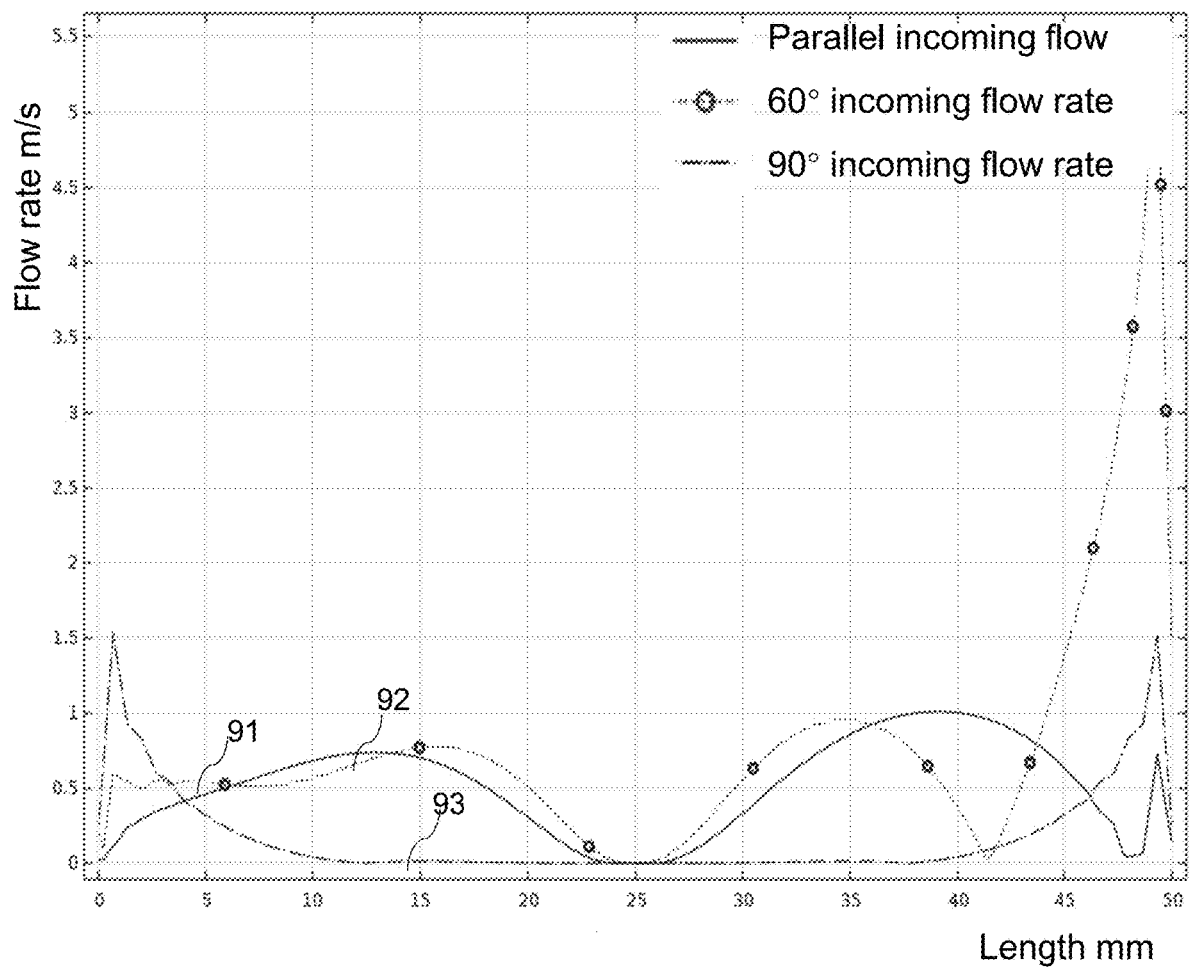
FIG. 9 is a schematic diagram illustrating a flow rate variation curve according to some embodiments of the present disclosure.

FIG. 9 is a schematic diagram illustrating a flow rate variation curve according to some embodiments of the present disclosure. As shown in FIG. 9, the horizontal coordinate may indicate the length (mm), where the length may be a length of a path of an object starting at the second end portion 8112 (illustrated in FIG. 8) and moving along the surface of the side wall corresponding to the depression region in the concave section. The vertical coordinate may indicate an airflow rate (m/s) at different locations having different distances with respect to the second end portion. A curve 91 (the curve marked by "parallel incoming flow" in FIG. 9) represents a flow rate variation curve at different locations when the flow direction is parallel to the length direction of the deflector structure, a curve 92 (the curve marked by "60° incoming flow rate" in FIG. 9) is a flow rate variation curve at different locations when the angle between the flow direction and the length direction of the deflector structure is 60°, and a curve 93 (the curve marked by "90° incoming flow rate" in FIG. 9) is a flow rate variation curve at different locations when the angle between the flow direction and the length direction of the deflector structure is 90°. As shown in FIG. 9, in the region 0 mm-45 mm to the right of the second end portion 8112 of the first connecting section 811 (i.e., within the depression region of the concave section 812), the airflow rates in different incoming flow directions may be less than 1.5 m/s, and the airflow rate in this region may be much less than that of the external airflow (10 m/s). In addition, in the region 23 mm-27 mm to the right of the second end portion 8112 of the first connecting section 811 (the bottom side of the depression region), the airflow rates in different incoming flow directions have very small values.

As shown in FIG. 8 and FIG. 9, it can be seen that the depression region of the concave section in the deflector structure may provide a location-specific low flow rate region when facing the airflow in different incoming directions, and at the same time, a minimal value of the airflow rate in different incoming directions may occur within a specific region when facing the airflow in different incoming directions in the deflector structure. In order to reduce the influence of external airflow on the first microphone and to ensure the quality of the sound signal captured by the first microphone when the user is speaking, in some embodiments, the corresponding sound inlet hole of the first microphone may be located at the side wall corresponding to the concave section of the depression region. In some embodiments, starting from the second end portion, along the side wall corresponding to the depression region of the concave section (e.g., the V-shaped profile illustrated in the image a in FIG. 8), the inlet hole corresponding to the first microphone may be located at a location 0 mm-45 mm from the second end portion of the first connecting section. Preferably, the corresponding sound inlet hole of the first microphone may be located at a location 5 mm-42 mm from the second end portion of the first connecting section. Further preferably, the corresponding sound inlet hole of the first microphone may be located at a location 20 mm-30 mm from the second end portion of the first connecting section. More preferably, the corresponding sound inlet hole of the first microphone may be located at a location 23 mm-27 mm from the second end portion of the first connecting section. Merely by way of example, the corresponding sound inlet hole of the first microphone may be located at a location 25 mm from the second end portion in the first connecting section. It should be noted that the distance from the second end portion of the first connecting section is the length of the path of an object moving from the second end portion 8112 (illustrated in FIG. 8) along the side wall surface corresponding to the depression region in the concave section. In some embodiments, the impact of external airflow on the first microphone may also be reduced by adjusting the ratio of the size of the corresponding sound inlet hole of the first microphone relative to the bottom side of the depression region to the length of the first connecting portion or the second connecting section. When the sound inlet hole corresponding to the first microphone is on the side wall of the first connecting portion, in some embodiments, a ratio of the size of the sound inlet hole relative to the bottom side of the depression region to the length of the first connecting portion may range from 0 to 1. Preferably, the ratio of the size of the inlet hole relative to the bottom side of the depression region to the length of the first connecting portion may range from 0-0.5. Further preferably, the ratio of the size of the inlet hole relative to the bottom side of the depression region to the length of the first connecting portion may range from 0-0.2. When the sound inlet hole corresponding to the first microphone is in the second connecting portion, a ratio range of the size of the inlet hole relative to the bottom side of the depression region to the length of the second connecting portion can be referred to the ratio range of the size of the sound inlet hole relative to the bottom side of the depression region to the length of the first connecting portion. It should be noted that the size of the sound inlet hole corresponding to the first microphone relative to the bottom side of the depression region refers to the length of the path of an object moving from the sound inlet hole to the bottom side of the depression region. In some embodiments, a side wall of the first connecting portion or the second connecting portion corresponding to the depression region is a flat plane or a curved plane.

Figure 10A:
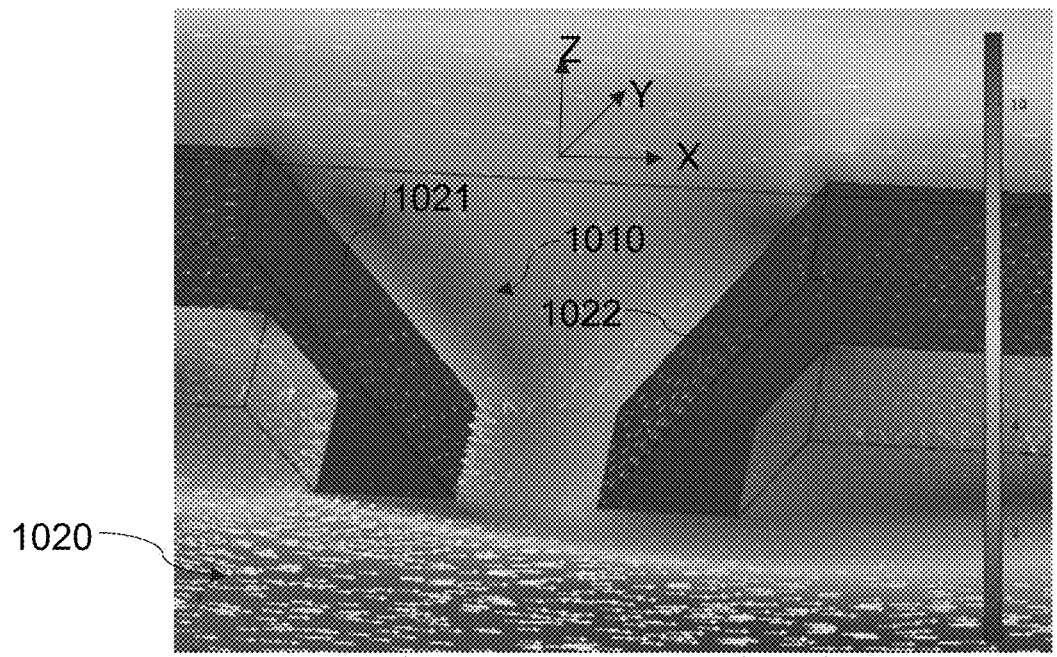
FIG. 10A is a schematic diagram illustrating a three-dimensional flow field distribution at parallel incoming flow directions according to some embodiments of the present disclosure.
Figure 10B:
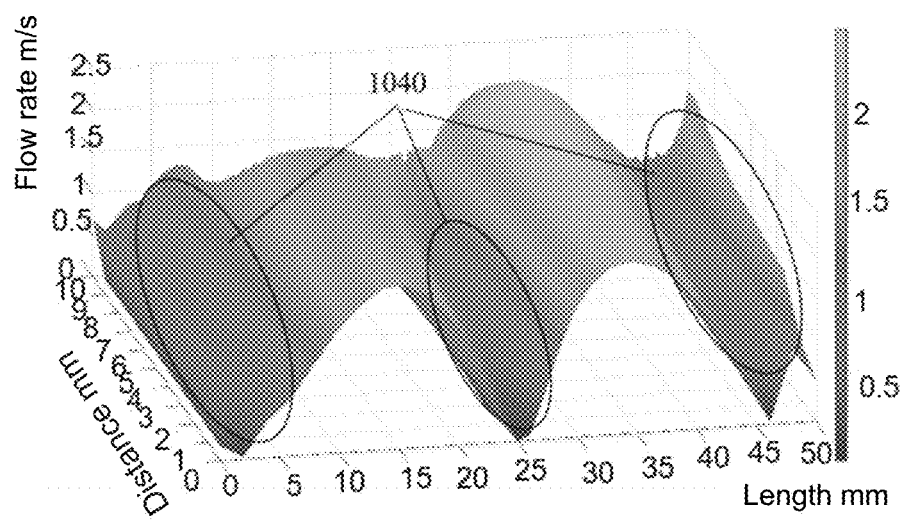
FIG. 10B is a schematic diagram illustrating an airflow rate distribution at parallel incoming flow directions at different locations in the depression region according to some embodiments of the present disclosure.

FIG. 10A disclosure is a schematic diagram illustrating a three-dimensional flow field distribution at parallel incoming flow directions according to some embodiments of the present disclosure. FIG. 10B is a schematic diagram illustrating an airflow rate distribution at parallel incoming flow directions at different locations in the depression region according to some embodiments of the present disclosure.

As shown in FIG. 10A, the deflector structure is provided along the flow direction of the airflow, wherein the flow rate of the airflow is 10 m/s, the length direction of the deflector structure (an X direction shown in FIG. 10A) may be the same as the flow direction of the airflow, one side of the deflector structure along the width direction (a Y direction shown in FIG. 10A) may be in contact with a wall 1010, and the other side of the deflector structure along the width direction may be exposed to airflow environment 1020 to simulate the scenario when the user wears the wearable device. In addition, the Y-direction shown in FIG. 10A may be used to indicate the height direction of the deflector structure. As shown in FIG. 10A, because the wearable device is worn on the head region of the user, the wall 1010 does not extend indefinitely, and the airflow at the wall 1010 may spill out to the airflow environment 1020 along the width direction of the concave section, causing the airflow at the depression region in the concave section, but the region near a first connecting portion 1021 and a second connecting portion 1022 in the concave section still has a low-flow rate region (i.e., a region with a relatively deep gray level in the depression region in FIG. 10A). As shown in FIG. 10B, the "length (mm)" coordinate marked in FIG. 10B may indicate a length of the concave section along the length direction, the "distance (mm)" coordinate marked in FIG. 10B may indicate a distance to the wall 1010, and the "rate (m/s)" coordinate marked in FIG. 10B may indicate an airflow rate at different locations of the concave section. As shown in FIG. 10A and FIG. 10B, a low-flow rage region 1040 may still exist near the surface of the first connecting portion 1021, near the surface of the second connecting portion 1022, and at the bottom side of the depression region; and the closer to the wall 1010, the lower the rate of airflow. In addition, the surface of the second connecting portion 1022 has a maximum peak value of airflow rate, and the maximum peak value does not exceed 2 m/s.

Figure 11A:
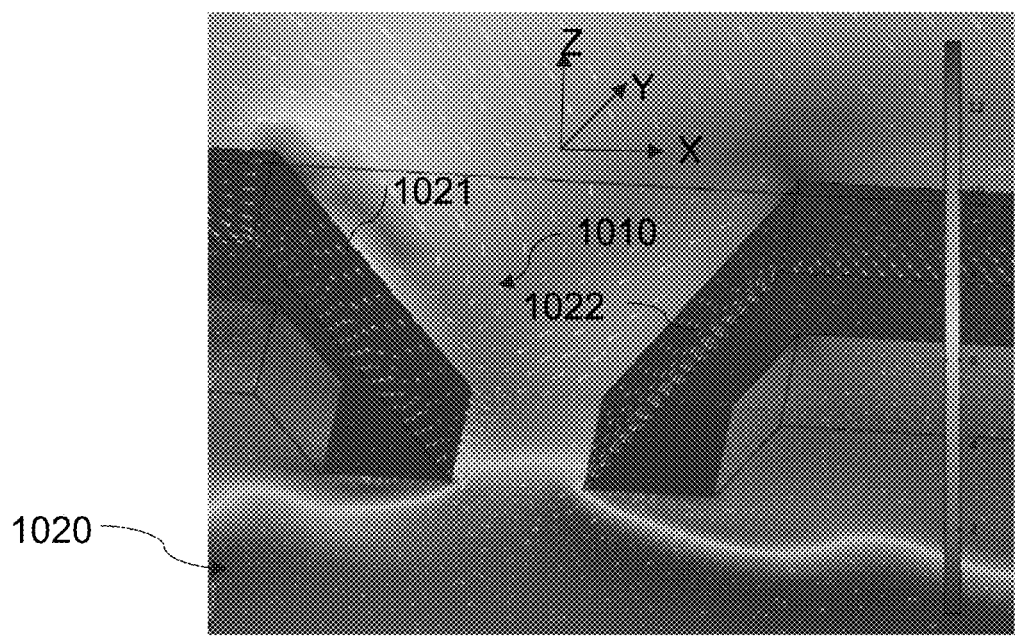
FIG. 11A is a schematic diagram illustrating a three-dimensional flow field distribution when the incoming flow direction is 60° according to some embodiments of the present disclosure.
Figure 11B:
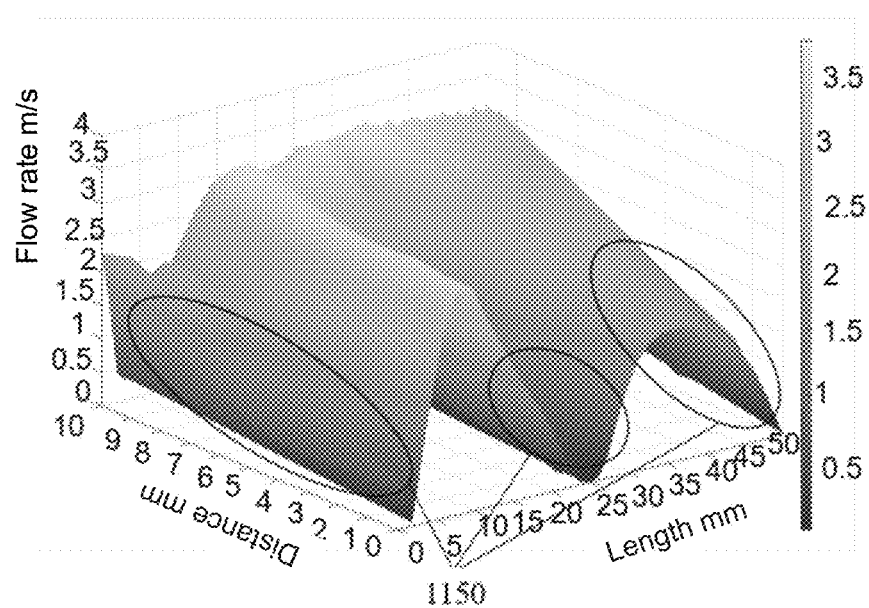
FIG. 11B is a schematic diagram illustrating an airflow rate distribution at different locations in the depression region when the incoming flow direction is 60° according to some embodiments of the present disclosure.

FIG. 11A is a schematic diagram illustrating a three-dimensional flow field distribution when the incoming flow direction is 60° according to some embodiments of the present disclosure. FIG. 11B is a schematic diagram illustrating an airflow rate distribution at different locations in the depression region when the incoming flow direction is 60° according to some embodiments of the present disclosure.

As shown in FIG. 11A, the flow rate of the airflow is 10 m/s, an angle between the length direction of the deflector structure (an X direction shown in FIG. 11A) and the flow direction of the airflow may be 60°, one side of the deflector structure along the width direction (a Y direction shown in FIG. 11A) may be in contact with the wall 1010, and the other side of the deflector structure along the width direction is exposed to the airflow environment 1020 to simulate the scenario when the user wears the wearable device. In addition, the Y-direction shown in FIG. 11A may be used to indicate the height direction of the deflector structure. As shown in FIG. 11A, since the wearable device is worn on the head region of the user, the wall 1010 may not extend indefinitely and the airflow at the wall 1010 may spill out to the airflow environment 1020 along the width direction of the concave section, causing the airflow at the depression region in the concave section, but a low flow rate region (i.e., the region with a relatively deep gray level in the depression region in FIG. 11A) may still exist near the first connecting portion 1021 and the second connecting portion 1022 in the concave section. As shown in FIG. 11B, the "length (mm)" coordinate marked in FIG. 11B may indicate a length of the concave section along the length direction, the "distance (mm)" coordinate marked in FIG. 11B may indicate a distance to the wall 1010, and the "rate (m/s)" coordinate marked in FIG. 11B may indicate an airflow rate at different locations of the concave section. As shown in FIG. 11A and FIG. 11B, a low flow rate region 1050 may exist near the surface of the first connecting portion 1021, near the surface of the second connecting portion 1022, near the bottom side of the depression region; and the closer to the wall 1010, the lower the rate of airflow. In addition, a maximum flow rate near the surface of the first connecting portion 1021 does not exceed 3.5 m/s.

Figure 12A:
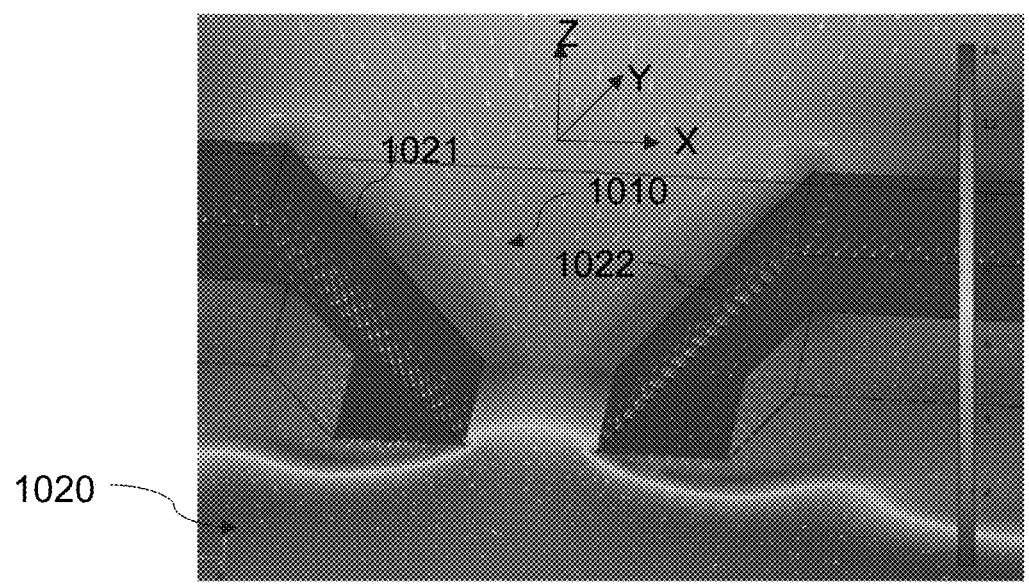
FIG. 12A is a schematic diagram illustrating a three-dimensional flow field distribution when the incoming flow direction is 90° according to some embodiments of the present disclosure.
Figure 12B:
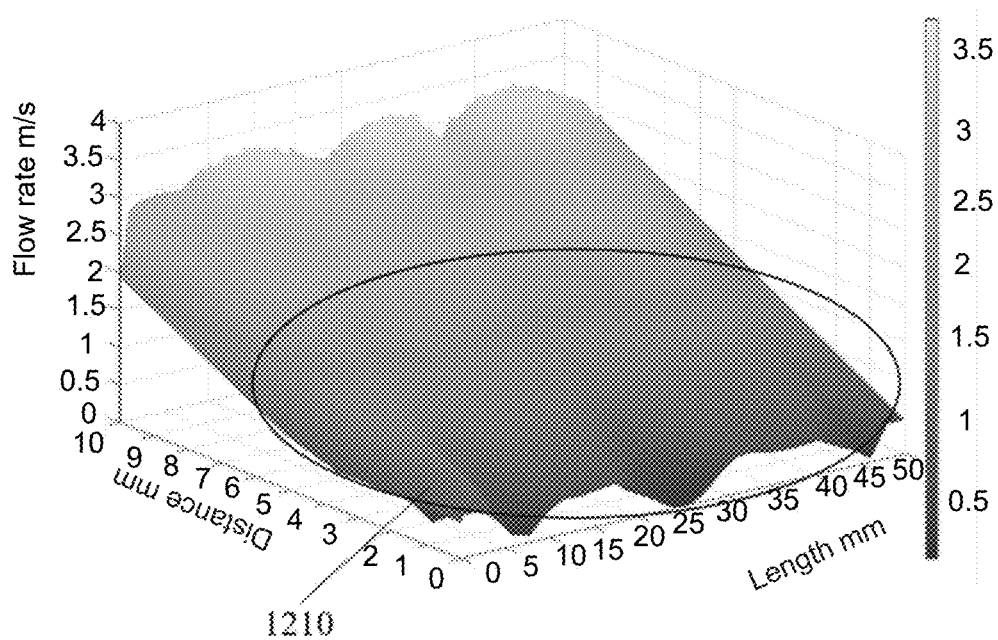
FIG. 12B is a schematic diagram illustrating an airflow rate distribution at different locations in the depression region when the incoming flow direction is 90° according to some embodiments of the present disclosure.

FIG. 12A is a schematic diagram illustrating a three-dimensional flow field distribution when the incoming flow direction is 90° according to some embodiments of the present disclosure. FIG. 12B is a schematic diagram illustrating an airflow rate distribution at different locations in the depression region at when the incoming flow direction is 90° according to some embodiments of the present disclosure.

As shown in FIG. 12A, the flow rate of the airflow is 10 m/s, the angle between the length direction of the deflector structure (an X direction shown in FIG. 12A) and the flow direction of the airflow may be 90°, one side of the deflector structure along the width direction (a Y direction shown in FIG. 12A) may be in contact with the wall 1010, and the other side of the deflector structure along the width direction may be exposed to the airflow environment 1020 to simulate the scenario when the user wears the wearable device. In addition, the Y-direction shown in FIG. 12A may be configured to indicate the height direction of the deflector structure. As shown in FIG. 12A, since the wearable device is worn on the head region of the user, the wall 1010 may not extend indefinitely and the airflow at the wall 1010 may spill out to the airflow environment 1020 along the width direction of the concave section, causing the airflow at the depression region in the concave section, but a low-flow rate region (i.e., the region with a relatively deep gray level in the depression region in FIG. 12A) may still exist near the first connecting portion 1021 and the second connecting portion 1022 in the concave section. As shown in FIG. 12B, the "length (mm)" coordinate marked in FIG. 12B may indicate the length of the concave section along the length direction, the "distance (mm)" coordinate marked in FIG. 12B may indicate the distance to wall 1010, and the "rate (m/s)" coordinate marked in FIG. 12B may indicate the airflow rate at different locations of the concave section. As shown in FIG. 12A and FIG. 12B, a low flow rate region 1210 may still exist on the surface near the first connecting portion 1021, the surface of the second connecting portion 1022, and the bottom side area of the depression region; and the closer to the wall 1010, the lower the rate of airflow.

As stated above, the concave section of the deflector structure may provide a low flow rate region with a better effect of reducing the airflow rate. In order to ensure the quality of the sound signal captured by the first microphone, in some embodiments, the corresponding sound inlet hole of the first microphone may be located at the bottom side of the first connecting portion, the second connecting portion, or the depression region. When a user wears the wearable device, one side of the concave section may be close to or fits the user's skin (hereinafter referred to as a first side section), and the other side of the concave section may be away from the user's skin (hereinafter referred to as a second side section). To further improve the quality of the sound signal captured by the first microphone, in some embodiments, the corresponding sound inlet hole of the first microphone may be located in the depression region in the concave section near the first side portion when the user is wearing the wearable device. For example, a sound inlet hole corresponding to the first microphone may be located on the first connecting section, the second connecting portion, or the bottom side of the depression region near the first side section. In some embodiments, a distance between the corresponding sound inlet hole of the first microphone and the first side section may be 0 mm-10 mm. Preferably, the distance between the corresponding sound inlet hole of the first microphone and the first side section may be 0.2 mm to 7 mm. Further preferably, the distance between the corresponding sound inlet hole of the first microphone and the first side section may be 0.3 mm to 5 mm. Preferably, the distance between the corresponding sound inlet hole of the first microphone and the first side section may be 0.3 mm to 3 mm. Further preferably, the distance between the corresponding sound inlet hole of the first microphone and the first side section may be 0.5 mm to 1.5 mm. In some embodiments, it is also possible to improve the quality of the sound signal captured by the first microphone by adjusting the ratio of the distance between the sound inlet hole and the first side section to the size of the concave section in its width direction. In some embodiments, the ratio of the distance between the sound inlet hole and the first side section to the dimension of the concave section in its width direction may be 0.01-0.9. Preferably, the ratio of the distance between the sound inlet hole and the first side section to the dimension of the concave section in its width direction may be 0.02-0.7. Further preferably, the ratio of the distance between the sound inlet hole and the first side section to the dimension of the concave section in its width direction may be 0.03-0.5. More preferably, the ratio of the distance between the sound inlet hole and the first side section to the dimension of the concave section in its width direction may be 0.04-0.3. More preferably, the ratio of the distance between the sound inlet hole and the first side section to the dimension of the concave section in its width direction may be 0.05-0.2. It should be noted that the above distance between the sound inlet hole and the first side section is the distance between the inlet hole and the first side section along the width direction of the deflector structure (e.g., the Y direction in FIG. 10A).

To further reduce the effect of external airflow on the first microphone, the wearable device may also include a sound conduction structure for transmitting external sound, the sound conduction structure may be connected to the concave section, the sound conduction structure may have an internal pass through structure, one end of the sound conduction structure may be connected to the external environment, and the first microphone may be located at the other end of the sound conduction structure. In some embodiments, the sound conduction structure may be a separate component relative to the concave section. For example, a cavity for the sound conduction structure is opened in the side wall corresponding to the depression region of the concave section, and the sound conduction structure is located in the cavity. In some embodiments, the sound conduction structure and the concave section may be an integral part. For example, the sound conduction structure may be a sound conduction cavity opened in the side wall corresponding to the depression region of the concave section.

Figure 13:
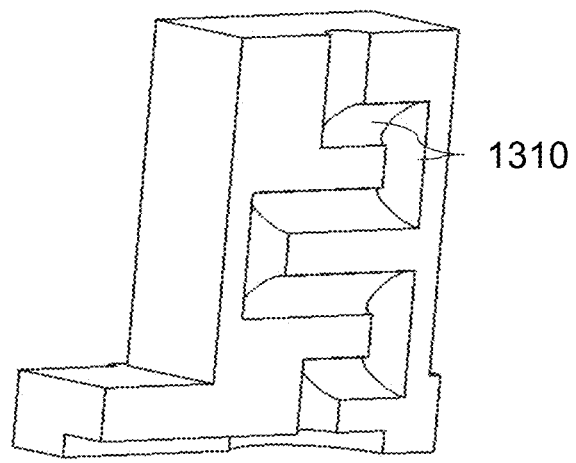
FIG. 13 is a schematic diagram illustrating a structure of a sound conduction structure according to some embodiments of the present disclosure.

FIG. 13 is a schematic diagram illustrating a structure of a sound conduction structure according to some embodiments of the present disclosure. As shown in FIG. 13, the sound conduction structure 1300 may be an internal pass-through structure, and the sound conduction structure 1300 may be provided with a plurality of sound conduction channels inside, and the plurality of sound conduction channels may be obliquely connected in sequence. The sound conduction channel located at the top of the sound conduction structure 1300 may be connected to the external environment, and the first microphone may be located at the sound conduction channel at the bottom side of the sound conduction structure 1300. When the external airflow enters the sound conduction structure 1300, the airflow may form a vortex when it meets the bending connection of the two sound conduction channels, the kinetic energy of the airflow is consumed at this time, and when the airflow reaches the first microphone, the rate of the airflow may be greatly reduced, thus further reducing the impact of the external airflow on the sound signal collected by the first microphone. In some embodiments, the shape of the sound conduction channel 1310 may be cylindrical, polygonal (e.g., rectangular, trigonal), trapezoidal, or other regular shapes. In some embodiments, the sound conduction channel 1310 may also be non-regularly shaped, for example, horn-shaped.

In order to ensure the wind noise reduction effect of the sound conduction structure, a bending angle of each sound conduction channel in the sound conduction structure 1300 is set within a specific range of angles. Merely by way of example, in some embodiments, the bending angles of the sound conduction channels in the sound conduction structure 1300 may be in a range of 65°-135°. Preferably, the bending angle of each sound conduction channel in the sound conduction structure 1300 may be in a range of 70°-120°. Further preferably, the bending angle of each sound conduction channel in the sound conduction structure 1300 may be in a range of 85°-95°. More preferably, the bending angle of each sound conduction channel in the sound conduction structure 1300 may be 90°. It should be noted that the bending angles of different sound conduction channels may be the same or different, and the bending angle of each sound conduction channel in the sound conduction structure 1300 is not limited to the above range, but may also be greater than 135° or less than 65°. In some embodiments, the cross-sectional shape of the sound conduction channel may be polygonal (e.g., triangular, quadrilateral, pentagonal, etc.), circular, semicircular, elliptical, semi-elliptical, and other shapes. In some embodiments, the dimensions of the different locations of the sound conduction channels may be the same or different. For example, the sound conduction channel may be a cylindrical channel, where the radius of each location of the sound conduction channel is the same. As another example, the sound conduction channel may be horn-shaped, in which case the radius of the channel increases or decreases gradually. In some embodiments, the shapes of the plurality of sound conduction channels may be the same or different. In addition, the bending portion between different sound conduction channels may be chamfered so that the airflow can create turbulence at the bend.

In some embodiments, the total length of the sound conduction channels in the sound conduction structure 1300 (the sum of the lengths of all the sound conduction channels) may be adjusted to ensure the wind noise reduction effect of the sound conduction structure. Merely by way of example, in some embodiments, the total length of the sound conduction channels may be greater than 10 mm. Preferably, the total length of the sound conduction channels may be greater than 13 mm. Further preferably, the total length of the sound conduction channels may be greater than 17 mm. Preferably, the total length of the sound conduction channels may be greater than 20 mm. For example, the total length of the sound conduction channels may be 20.4 mm. In some embodiments, the wind noise reduction effect of the sound conduction structure may also be ensured by adjusting the count of bends between the sound conduction channels in the sound conduction structure 1300. Merely by way of example, in some embodiments, the count of bends between the sound conduction channels may be greater than five. In some embodiments, the count of bends between the sound conduction channels may be greater than eight. In some embodiments, the count of bends between the sound conduction channels may be greater than 10.

Figure 14:
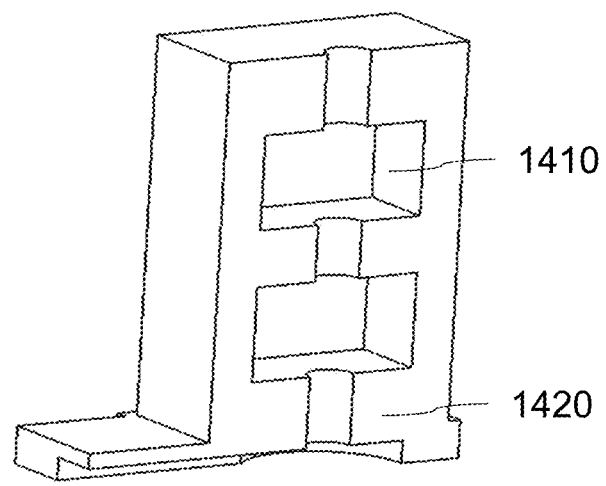
FIG. 14 is a schematic diagram illustrating a structure of a sound conduction structure according to some embodiments of the present disclosure.

In some embodiments, channels having different volumes may be provided in the sound conduction structure to reduce the airflow rate at the first microphone. FIG. 14 is a schematic diagram illustrating a structure of a sound conduction structure according to some embodiments of the present disclosure. As shown in FIG. 14, in some embodiments, the sound conduction structure 1400 may include a cavity 1410, which is connected to the external through a connecting hole 1420. In some embodiments, the count of cavities 1410 may be more than one, and the plurality of cavities 1410 may be located at intervals along the length of the sound conduction structure 1400, wherein the adjacent cavities 1410 may also be connected to each other by a connecting hole 1420. In some embodiments, the size of a cavity 1410 along the width of the sound conduction structure 1400 is larger than the size of a connecting hole 1420 along the width of the sound conduction structure 1400. When the external airflow enters the sound conduction structure 1400, the airflow may form a vortex system structure after encountering the connection between the connecting hole 1420 and the cavity 1410 due to the sudden change in volume, which causes the kinetic energy of the airflow to be consumed, and when the airflow reaches the first microphone, the rate of the airflow is greatly reduced, thus further reducing the effect of the external airflow on the sound signal collected by the first microphone.

In some embodiments, the dimensions (e.g., length, width, volume, or surface area) of a cavity or a connecting hole may be adjusted to ensure the wind noise reduction of the sound conduction structure. In some embodiments, the volume of a single cavity 1410 may be greater than 4 $mm^3$. Preferably, the volume of a single cavity 1410 may be greater than 10 $mm^3$. Further preferably, the volume of a single cavity 1410 may be greater than 20 $mm^3$. More preferably, the volume of a single cavity 1410 may be greater than 30 $mm^3$. More preferably, the volume of a single cavity 1410 may be greater than 40 $mm^3$. For example, the volume of a single cavity 1410 may be 40 $mm^3$. In some embodiments, the surface area corresponding to a single cavity 1410 may be greater than 12 $mm^2$. Preferably, the surface area corresponding to a single cavity 1410 may be greater than 30 $mm^2$. More preferably, the surface area corresponding to a single cavity 1410 may be greater than 60 $mm^2$. More preferably, the surface area corresponding to a single cavity 1410 may be greater than 70 $mm^2$. For example, the surface area corresponding to a single cavity 1410 may be 72 $mm^2$. In some embodiments, the diameter of a connecting hole 1420 may be 0.2 mm-2 mm, and the length of the connecting hole 1420 may be less than 5 mm. In some embodiments, the diameter of a connecting hole 1420 may be 0.4 mm-1.8 mm, and the length of the connecting hole 1420 may be less than 3 mm. For example, in some embodiments, the diameter of a connecting hole 1420 may be 1.1 mm and the length of the connecting hole 1420 may be 2 mm. In some embodiments, the cross-sectional shape of a cavity 1410 may be polygonal (e.g., triangular, quadrilateral, pentagonal, etc.), circular, semicircular, elliptical, semi-elliptical, and other shapes.

It should be noted that the sound conduction structure 1300 shown in FIG. 13 and the sound conduction structure 1400 shown in FIG. 14 can be installed in any microphone other than the first microphone, for example, the second microphone may also be provided with the sound conduction structure 1300 or the sound conduction structure 1400. In some embodiments, the sound conduction structure may also be a combination of the sound conduction structure 1300 shown in FIG. 13 and the sound conduction structure 1400 shown in FIG. 14. In some embodiments, the ends or internals of a sound conduction structure (e.g., the sound conduction structure 1300 and the sound conduction structure 1400) may also be provided with a mesh structure (not shown in the figures) to further reduce the effect of wind noise on the first microphone. In addition, the mesh structure prevents dust and particles in the outside world from entering the microphone.

Figure 15:
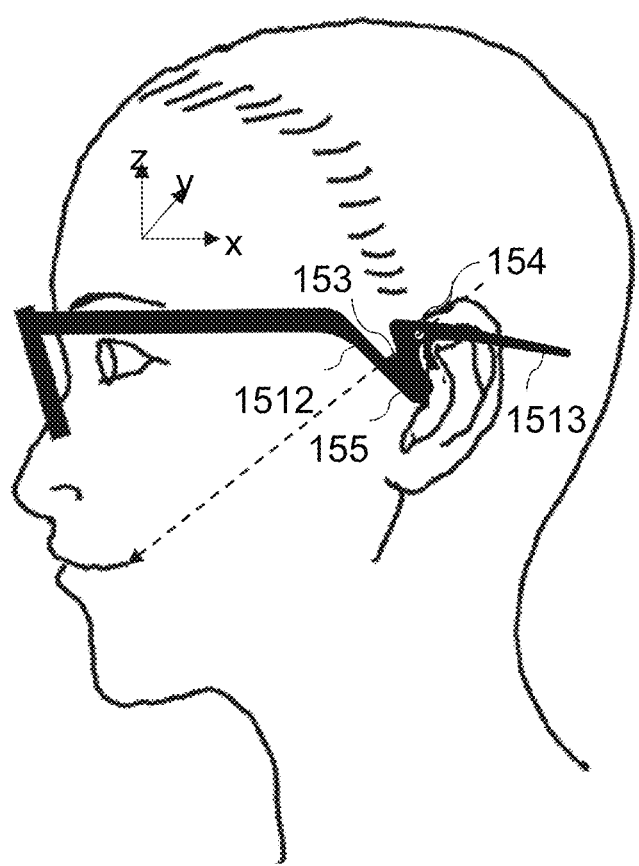
FIG. 15 is a schematic diagram illustrating a wearable device when worn by a user according to some embodiments of the present disclosure.

In some embodiments, the wearable device may include a first microphone and a second microphone, wherein when the user wears the wearable device, the connection line of the first microphone and the second microphone is in the direction of the mouth of the user, and the distance between the first microphone and the mouth of the user is smaller than the distance between the second microphone and the mouth of the human body. At this time, the first microphone may primarily be used to pick up the sound signal when the user is speaking, the second microphone may also pick up the sound signal when the user is speaking, and the processor of the wearable device may determine the sound signal when the user is speaking among the sound signals picked up by the first microphone and the second microphone through an algorithm, so that other sound signals (e.g., wind noise) can be filtered and processed. In some embodiments, the distance between the first microphone and the second microphone may be 5 mm-70 mm. Preferably, the distance between the first microphone and the second microphone may be 10 mm to 50 mm. Preferably, the distance between the first microphone and the second microphone may be 25 mm-30 mm. In some embodiments, the vibration direction of the diaphragm in the first microphone may be substantially perpendicular to the vibration direction of the diaphragm in the second microphone. The substantially perpendicular means that the vibration direction of the diaphragm in the first microphone may be 90° to the vibration direction of the diaphragm in the second microphone, or an angle close to 90°, such as 75°, 80°, 95°, 100°, etc. As shown in FIG. 15, in some embodiments, a first sound inlet hole 153 corresponding to the first microphone may be located at the side wall corresponding to the depression region in a concave section 1512. For example, the first sound inlet hole 153 corresponding to the first microphone may be located at the first connecting portion or the second connecting portion of the concave section 1512, or the connection between the two connecting portions. In order to further determine the wind noise in the sound signal picked up by the microphone, the vibration direction of the diaphragm of the first microphone is set perpendicular or approximately perpendicular to the vibration direction of the diaphragm of the second microphone, and the wind noise picked up by the microphone (e.g., the first microphone and the second microphone) may be further cancelled by an algorithm based on the correlation of the wind noises. In some embodiments, a second sound inlet hole 154 corresponding to the second microphone may be located at the second connecting section 1513 such that when the user wears the wearable device, a line connecting the first sound inlet hole 153 corresponding to the first microphone and the second sound inlet hole 154 corresponding to the second microphone directs toward the mouth of the user. In some embodiments, the second sound inlet hole 154 may also be located at the concave section 1512. For example, the second sound inlet hole 154 is located on the side of the second connecting portion of the concave section 1512 away from the first sound inlet hole 153. As another example, the second sound inlet hole 154 may also be located at the side wall of the second connecting portion corresponding to the depression region of the concave section 1512. In order to describe the length direction and width direction of the sound conduction structure more clearly, it is described in the context of the scenario when the user wears the wearable device. A three-dimensional coordinate system is established with any point of the head of the user as the origin, wherein the x-axis in the three-dimensional coordinate system is parallel to the horizontal plane, the z-axis is perpendicular to the horizontal plane, and the y-axis is perpendicular to the x-axis and z-axis. The length direction of the sound conduction structure may be regarded as the x-axis direction, the height direction of the sound conduction structure may be regarded as the z-axis direction, and the width direction of the sound conduction structure may be regarded as the y-axis direction. The length direction, width direction, or height direction of the sound conduction structure shown in each of the above accompanying figures (e.g., FIG. 4, FIG. 8, FIG. 10A-FIG. 12D) may refer to the scenario in FIG. 15 when a user is wearing a wearable device.

In some embodiments, the wearable device may also include an acoustic output unit 155, and the acoustic output unit 155 may be located at the concave section 1512. In some embodiments, the acoustic output unit 155 may be located on the external surface of the concave section 1512. For example, when the acoustic output unit 155 is a bone conduction speaker, the acoustic output unit 155 may be located on the side of the concave section 1512 that is in contact with the user. As another example, when the acoustic output unit 155 is an air conduction speaker, the acoustic output unit 155 may be located on the side of the concave section 1512 that is not in contact with the user. In some embodiments, the acoustic output unit 155 may be located inside the concave section 1512. For example, the concave section 1512 has an accommodation cavity (not shown in FIG. 15), and the acoustic output unit 155 may be located in this accommodation cavity. When the acoustic output unit 155 is located in this accommodation cavity, the concave section 1512 may serve as a housing for the acoustic output unit 155, and other components of the acoustic output unit 155 (e.g., a magnetic circuit structure, a diaphragm, etc.) may be located in the concave section 1512. In some embodiments, the acoustic output unit 155 may include a diaphragm and a magnetic circuit structure (not shown in FIG. 15), the diaphragm is connected to a voice coil, the voice coil extends into a magnetic gap of the magnetic circuit structure, the magnetic circuit structure is connected to the housing of the acoustic output unit 155 (or the concave section 1512). The side of the diaphragm facing the magnetic circuit structure forms the front of the acoustic output unit 155, the side of the magnetic circuit structure facing the diaphragm forms the back of the acoustic output unit 155, and the diaphragm vibrates so that the acoustic output unit radiates sound outward from its front and back, respectively. In some embodiments, the housing of the acoustic output unit 155 (or lower concave section 1512) may include at least two sound conduction holes (not shown in FIG. 15), which may include a first sound conduction hole (also referred to as a sound outlet hole) and a second sound conduction hole (also referred to as a pressure relief hole). The first sound conduction hole may be used to output sound from the front of the acoustic output unit 155, the second sound conduction hole may be used to output sound from the back of the acoustic output unit 155, and the phase of the sound output from the first sound conduction hole and the phase of the sound output from the second sound conduction hole may be considered opposite so that the sound output from the first sound conduction hole and the sound output from the second sound conduction hole may form a dipole. When the user wears the wearable device, the first sound conduction hole is close to the user's ear canal opening and the second sound conduction hole is back to the user's ear canal opening, which makes the acoustic output unit 155 have a better acoustic output effect. In some embodiments, the count of first sound conduction holes and second sound conduction holes may be one or more. In some embodiments, the number, size, location, acoustic resistance, and other parameters of the first or second sound conduction hole may be adjusted to further improve the listening effect and sound leakage reduction effect of the wearable device.

Figure 16:
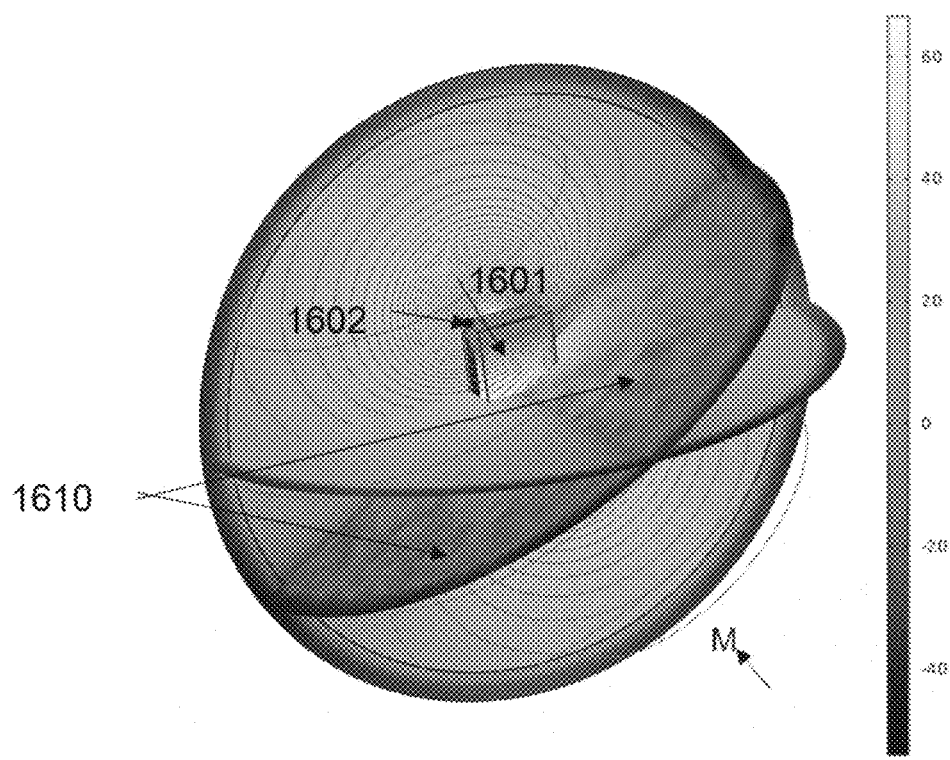
FIG. 16 is a schematic diagram illustrating a sound field radiation of an acoustic output unit according to some embodiments of the present disclosure.
Figure 17:
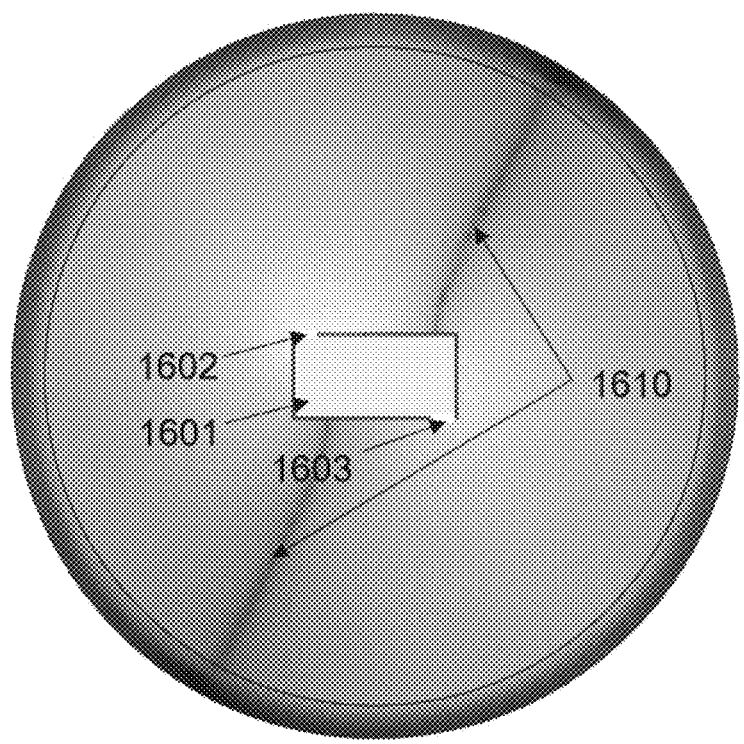
FIG. 17 is another schematic diagram illustrating a sound field radiation of an acoustic output unit according to some embodiments of the present disclosure.

The first microphone plays the main sound pickup function in picking up the sound signal when the user is speaking. In order to reduce the influence of the sound occurring in the acoustic output unit on the first microphone, in some embodiments, the vibration direction of the diaphragm of the first microphone is perpendicular or substantially perpendicular to the vibration direction of the diaphragm of the acoustic output unit. To further reduce the effect of the sound occurring in the acoustic output unit on the microphones, the first microphone and/or the second microphone may be located in the area least affected by the acoustic output unit, such as the acoustic zero region of the acoustic output unit. FIGS. 16 and 17 are schematic diagrams illustrating a sound field radiation of an acoustic output unit according to some embodiments of the present disclosure, wherein FIG. 17 shows the sound field radiation diagram from the viewpoint indicated by the arrow M in FIG. 16. As shown in FIG. 16 and FIG. 17, the acoustic zero region of the acoustic output unit 1601 is the darker colored region in the figures (i.e., a region 1610). The housing of the acoustic output unit 1601 may include at least two sound conduction holes, which may include a first sound conduction hole 1602 (also referred to as a sound outlet hole) and a second sound conduction hole 1603 (also referred to as a pressure relief hole), the first sound conduction hole 1602 may be configured to output sound from the front of the acoustic output unit 1601, and the second sound conduction hole 1603 may be configured to output sound from the back of the acoustic output unit 1601. The phase of the sound output from the first sound conduction hole 1602 and the phase of the sound output from the second sound conduction hole 1603 may be considered opposite, such that the sound output from the first sound conduction hole 1602 and the sound output from the second sound conduction hole 1603 may construct an acoustic dipole and form an acoustic zero region 1610. In some embodiments, the location of the first microphone and the second microphone may be selected and determined based on the acoustic zero region of the acoustic output unit.

It should be noted that different embodiments may produce different beneficial effects. In different embodiments, the beneficial effects that may be produced may be any one or combination of the above or any other beneficial effects that may be obtained.

The basic concept has been described above. Obviously, for those skilled in the art, the above detailed disclosure is only an example, and does not constitute a limitation to the present disclosure. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. Such as "one embodiment," "an embodiment," and/or "some embodiments" means a certain feature, structure, or characteristic associated with at least one embodiment of the present disclosure. Therefore, it should be emphasized and noted that two or more references to "an embodiment" or "one embodiment" or "an alternative embodiment" in various places in this specification are not necessarily referring to the same embodiment. In addition, some features, structures, or features in the present disclosure of one or more embodiments may be appropriately combined.

Furthermore, unless explicitly stated in the claims, the order of processing elements and sequences described in the present disclosure, the use of numbers and letters, or the use of other names are not intended to limit the order of the procedures and methods of the present disclosure. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

Some examples use numbers to describe quantities of ingredients and attributes, it should be understood that such numbers used to describe the examples, in some examples, use the modifiers "about", "approximately" or "substantially" to retouch. Unless stated otherwise, "about", "approximately" or "substantially" means that a variation of ±20% is allowed for the stated number. Accordingly, in some embodiments, the numerical parameters set forth in the specification and claims are approximations that can vary depending upon the desired characteristics of individual embodiments. In some embodiments, the numerical parameters should take into account the specified significant digits and use a general digit reservation method. Notwithstanding that the numerical fields and parameters used in some embodiments of the present disclosure to confirm the breadth of their ranges are approximations, in particular embodiments such numerical values are set as precisely as practicable.

Each patent, patent application, patent application publication, and other material, such as article, book, specification, publication, document, etc., cited in this application is hereby incorporated by reference in its entirety. Application history documents that are inconsistent with or conflict with the contents of this application are excluded, as are documents (currently or hereafter appended to this application) that limit the broadest scope of the claims of this application. It should be noted that, if there is any inconsistency or conflict between the descriptions, definitions and/or terms used in the attached materials of this application and the content of this application, the descriptions, definitions and/or terms used in this application shall prevail.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A wearable device, comprising:
   a deflector structure configured to be worn on a head of a user, wherein the deflector structure includes:
   a first connecting section, a second connecting section, and a concave section, the first connecting section, the concave section, and the second connecting section being connected in sequence, the concave section having a downward depression region relative to the deflector structure; and
   a first microphone configured to collect a sound signal, the first microphone being located at the downward depression region.

2. The wearable device of claim 1, wherein the first microphone is located at a bottom side of the downward depression region in the concave section.

3. The wearable device of claim 1, wherein the first connecting section includes a first end portion and a second end portion, the second end portion is connected to the concave section, a height of the first end portion relative to a bottom of the concave section is not greater than a height of the second end portion relative to the bottom of the concave section.

4. The wearable device of claim 3, wherein the second connecting section includes a third end portion and a fourth end portion, the third end portion is connected to the concave section, a height of the third end portion relative to the bottom of the concave section is not less than a height of the fourth end portion relative to the bottom of the concave section.

5. The wearable device of claim 4, wherein the height of the second end portion relative to the bottom of the concave section is not less than the height of the third end portion relative to the bottom of the concave section.

6. The wearable device of claim 1, wherein the concave section includes a first connecting portion and a second connecting portion, the first connecting portion is obliquely connected to the first connecting section and extends downward, the second connecting portion is obliquely and connected to the second connecting section and extends downward, an end of the first connecting portion away from the first connecting section is connected to an end of the second connecting portion away from the second connecting section.

7. The wearable device of claim 6, wherein a distance between the first connecting portion and the second connecting portion decreases gradually along a depressed direction of the concave section.

8. The wearable device of claim 1, further including a sound conduction structure configured to transmit external sound, wherein the sound conduction structure is connected to the concave section, the sound conduction structure is an internal through structure, one end of the sound conduction structure is connected to external environment, and the first microphone is located at another end of the sound conduction structure.

9. The wearable device of claim 8, wherein a plurality of sound conduction channels are arranged inside the sound conduction structure and the plurality of sound conduction channels is obliquely connected in sequence.

10. The wearable device of claim 8, wherein the sound conduction structure includes a cavity, the cavity is connected to external via a connecting hole.

11. The wearable device of claim 8, wherein the sound conduction structure includes a plurality of cavities, the plurality of cavities is distributed at intervals along a length direction of the sound conduction structure, adjacent cavities are connected to each other by a connecting hole;

a dimension of the cavity along a width direction of the sound conduction structure is larger than a dimension of the connecting hole along the width direction of the sound conduction structure.

12. The wearable device of claim 1, wherein the second connecting section is provided with a second microphone.

13. The wearable device of claim 12, wherein when the wearable device is worn by the user, a connection line between the first microphone and the second microphone points to a direction of mouth of the user.

14. The wearable device of claim 12, wherein a vibration direction of a diaphragm in the first microphone is substantially perpendicular to a vibration direction of a diaphragm in the second microphone.

15. The wearable device of claim 12, wherein a distance between the first microphone and the second microphone is 5 mm-70 mm.

16. The wearable device of claim 15, wherein the wearable device further includes an acoustic output unit, the acoustic output unit is located at the concave section.

17. The wearable device of claim 16, wherein a vibration direction of a diaphragm of the first microphone is substantially perpendicular to a vibration direction of a diaphragm of the acoustic output unit.

18. The wearable device of claim 16, wherein the first microphone or the second microphone is located in an acoustic zero region of the acoustic output unit.

19. The wearable device of claim 1, wherein the deflector structure includes a first deflector structure and a second deflector structure, the first deflector structure and the second deflector structure are placed on a left ear and a right ear of the user, respectively.

20. The wearable device of claim 19, wherein the device further includes a visual member, the visual member is connected to a first connecting section of the first deflector structure or the second deflector structure.

* * * * *